(12) United States Patent
Helmick

(10) Patent No.: US 12,050,497 B2
(45) Date of Patent: Jul. 30, 2024

(54) SYSTEMS AND METHODS FOR POWER RELAXATION ON STARTUP

(71) Applicant: Samsung Electronics Co., Ltd., Suwon-si (KR)

(72) Inventor: Daniel Lee Helmick, Broomfield, CO (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 17/692,161

(22) Filed: Mar. 10, 2022

(65) Prior Publication Data

US 2023/0229217 A1 Jul. 20, 2023

Related U.S. Application Data

(60) Provisional application No. 63/299,906, filed on Jan. 14, 2022.

(51) Int. Cl.
*G06F 1/26* (2006.01)

(52) U.S. Cl.
CPC .................................. *G06F 1/266* (2013.01)

(58) Field of Classification Search
CPC ....................................................... G06F 1/266
See application file for complete search history.

(56) References Cited

U.S. PATENT DOCUMENTS

| | | | |
|---|---|---|---|
| 6,681,336 B1 * | 1/2004 | Nakazato | G06F 1/329 713/1 |
| 7,075,744 B2 | 7/2006 | Cumpson et al. | |
| 7,412,615 B2 | 8/2008 | Yokota et al. | |
| 7,543,108 B2 | 6/2009 | Kakihara et al. | |
| 8,135,969 B2 | 3/2012 | Kawakami | |
| 8,879,349 B2 | 11/2014 | Yoshii et al. | |
| 9,250,820 B2 | 2/2016 | Salessi et al. | |
| 9,317,212 B2 | 4/2016 | Huffman et al. | |
| 9,323,304 B2 | 4/2016 | Salessi et al. | |
| 9,959,042 B2 | 5/2018 | Adavi et al. | |
| 10,983,580 B2 | 4/2021 | Mizuno et al. | |
| 2011/0320796 A1 | 12/2011 | DeCusatis et al. | |
| 2013/0205130 A1* | 8/2013 | Hallowell | G06F 9/4401 713/2 |
| 2015/0113309 A1* | 4/2015 | Grieco | G06F 21/81 713/340 |

(Continued)

FOREIGN PATENT DOCUMENTS

JP 6908282 B2 7/2021

OTHER PUBLICATIONS

European Extended Search Report for Application No. 23150137.0, mailed Jun. 6, 2023.

*Primary Examiner* — Jaweed A Abbaszadeh
*Assistant Examiner* — Brian J Corcoran
(74) *Attorney, Agent, or Firm* — Renaissance IP Law Group LLP

(57) ABSTRACT

A storage unit is disclosed. The storage unit may include an interface to a host and storage for a data. A receiver may receive from a host a boot power data. The boot power data may including a first power level and a duration. A circuit may boot the storage unit based at least in part on the boot power data. The storage unit may include a second power level, with the first power level greater than the second power level.

20 Claims, 15 Drawing Sheets

| | Power Level | Duration | Identifier |
|---|---|---|---|
| 520-1 → | 14 W | 1 sec | A |
| 520-2 → | 13 W | 4 sec | B |
| 520-3 → | 12.5 W | 10 sec | C |
| 520-4 → | 12 W | ∞ | D |

(56) References Cited

U.S. PATENT DOCUMENTS

| | | | |
|---|---|---|---|
| 2015/0370681 A1* | 12/2015 | Tonry | G06F 11/24 |
| | | | 702/58 |
| 2018/0210539 A1 | 7/2018 | Hashimoto | |
| 2020/0104062 A1 | 4/2020 | Cho | |
| 2020/0356153 A1 | 11/2020 | Kim | |
| 2021/0303209 A1 | 9/2021 | Chun | |

* cited by examiner

| Power Level | Duration | Identifier |
|---|---|---|
| 14 W | 1 sec | A |
| 13 W | 4 sec | B |
| 12.5 W | 10 sec | C |
| 12 W | ∞ | D |

SYSTEMS AND METHODS FOR POWER RELAXATION ON STARTUP

RELATED APPLICATION DATA

This application claims the benefit of U.S. Provisional Patent Application Ser. No. 63/299,906, filed Jan. 14, 2022, which is incorporated by reference herein for all purposes.

FIELD

The disclosure relates generally to storage devices, and more particularly to relaxing power limitations on storage device startup.

BACKGROUND

The present background section is intended to provide context only, and the disclosure of any concept in this section does not constitute an admission that said concept is prior art.

Enterprise environments are mindful of the costs to operate servers. The power consumed by storage devices may translate into expenses for electricity: the greater the power consumed, the higher the expense for electricity. But operating storage devices at lower power levels to reduce costs has potential downsides. Storage devices may be designed to operate most efficiently at a particular power level. While the storage devices may be capable of operating at lower power levels, such operations may be less efficient, meaning that performing read/write operations on the storage device may take longer due to the power constraints. Slower storage device performance may result in delays in responding to customer requests, this slower storage device performance is not desirable.

A need remains to manage power consumption in storage devices to balance these concerns.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
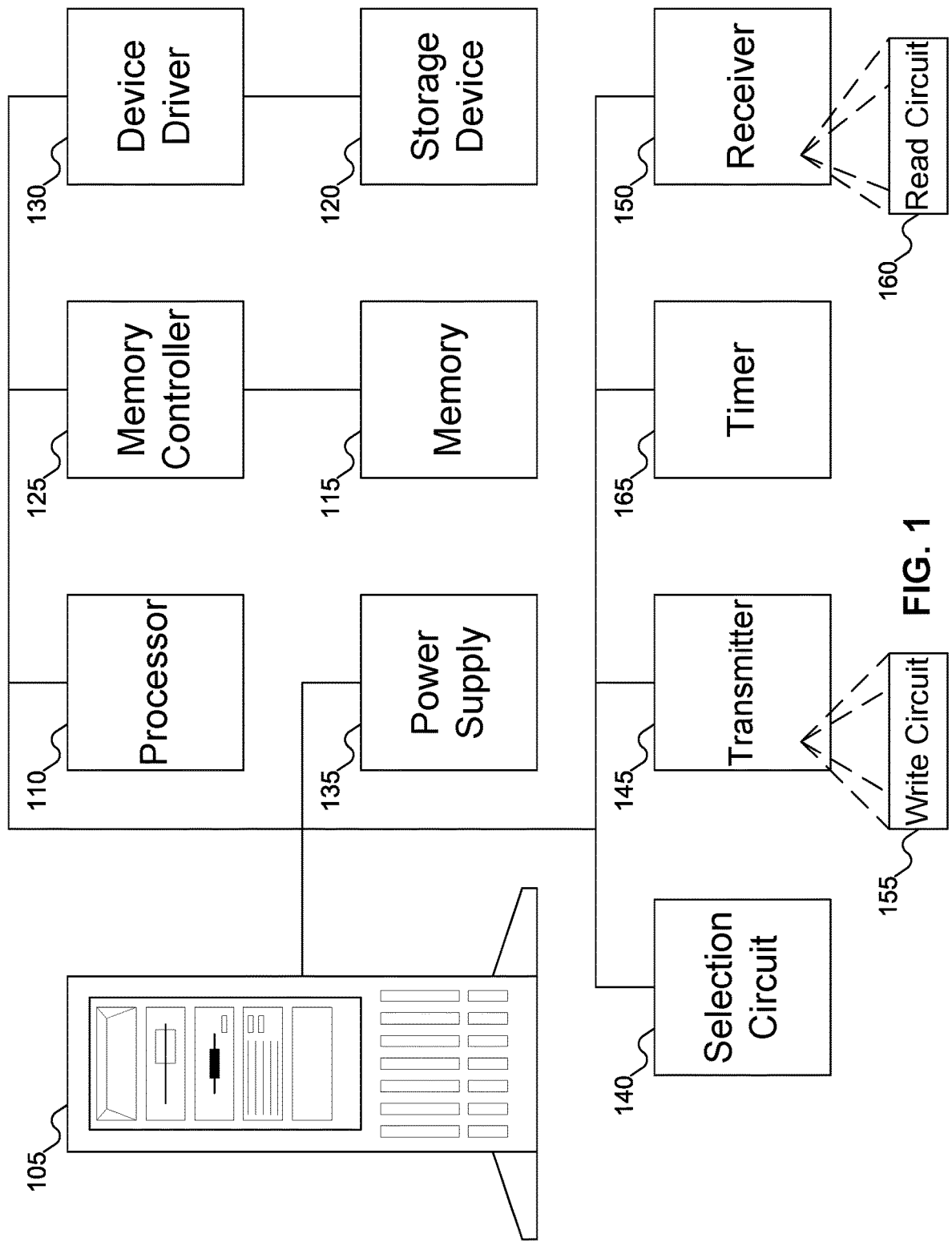
FIG. 1 shows a machine to enable storage devices to exceed their normal maximum power during boot, according to embodiments of the disclosure.

Embodiments of the disclosure may include a storage device. The storage device may include an interface with a host and may store data. The storage device may receive from the host a boot power data, which the storage device may then use to boot using a power level higher than the normal power level of the storage device.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

In enterprise environments, which may include large numbers of servers, each including large numbers of storage devices, power consumption and heat management are concerns. With potentially hundreds or thousands of storage devices in an enterprise environment, the cost to power so many storage devices may be a significant expense. One approach to reducing this expense is to set limits on the amount of power a storage device may use in such an environment: lower power consumption may lead to lower expenses for electricity.

Heat is also a concern in enterprise environments. Heat may damage electronic equipment, leading to potentially expensive repairs, not to mention downtime while such equipment is being repaired. Heat may be a consequence of power consumption: the more power a device consumes, the hotter it may become, increasing the risk of damage to it or other components due to heat. Again, setting a limit on the amount of power a storage device may use may reduce the amount of heat generated by the device, thereby reducing the risk of damage to equipment.

But limiting the power consumed by a storage device may also have some negative consequences. The amount of time needed to boot a storage device may be a function of the amount of power used: the lower the power used, the longer it may take for the storage device to boot. It might take a single server 20 minutes or more to boot when the amount of power a storage device is permitted to use is limited. Multiply this by the number of servers in an enterprise environment, and it might take a significant amount of time to bring an enterprise environment fully online: time in which customers may be unable to access services offered by the enterprise. Further, the reduced performance may be overly conservative during system boot when the computer components are not yet at their steady state operating temperatures, and computer component boot order can be optimized prior to full system operation.

Embodiments of the disclosure address these problems by permitting storage devices to exceed the power limits for a short duration when booting. Because booting typically occurs from a cold server, the increased heat generated by the storage device may entail less risk to the equipment. In addition, because the host may specify the boot order, the enclosure may have excess power available that may be utilized by individual storage devices in turn. In this manner, each storage device may use excess power for a short duration to expedite the boot process for that device: multiplied over all storage devices in the enclosure, the expedited boot process may enable bringing the server online more quickly, enabling the enterprise to offer services to customers sooner.

FIG. 1 shows a machine to enable storage devices to exceed their normal maximum power during boot, according to embodiments of the disclosure. In FIG. 1, machine 105, which may also be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may be a volatile or non-volatile memory, as desired. Memory 115 may use any desired form factor: for example, Single In-Line Memory Module (SIMM), Dual In-Line Memory Module (DIMM), Non-Volatile DIMM (NVDIMM), etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may also include any desired interface, including, for example, a Peripheral Component Interconnect Express (PCIe) interface, or a Compute Express Link (CXL) interface. Storage device 120 may also take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

Storage device 120 may have a normal power level used for normal operations, such as processing read or write requests. This normal power level may be part of a specification for storage device 120, or this normal power level may be selected by a consumer (and storage device 120 may be designed to operate at this normal power level). Note that this normal power level is not necessarily the lowest power level at which storage device 120 may function: for example, storage device 120 may have an idle state in which storage device 120 draws a minimum of power, but not sufficient power to process read or write requests.

While FIG. 1 uses the generic term "storage device", embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices.

The term "storage unit" is intended to encompass both storage device 120 and memory 115. That is, where the term "storage unit" is used below, the term should be understood as including both storage device 120 and memory 115. While the discussion below may focus on storage device 120 (and potentially more particularly on an SSD), it may be understood that embodiments of the disclosure may similarly cover memory 115, whether or not expressly stated, and thus may be understood more generally to be about a storage unit.

Machine 105 may also include power supply 135. Power supply 135 may provide power to machine 105 and its components. Power supply 135 may have a maximum amount of power that may be used (before exceeding the specifications of power supply 135): this information may be known to machine 105 and may be used, for example, by selection circuit 140 in determining a boot order and/or how much power each storage unit may use to boot. Typically, power supply 135 may be selected so that the its maximum amount of power is sufficient (with potentially some budget for excess power) is sufficient to cover the normal power expectations of all components in machine 105.

Operating machine 105 may involve various costs. Machine 105 may include many components. For example, machine 105 might include 24 storage devices 120, each consuming 12 W. In that case machine 105 would draw 288 W just for storage devices alone, at their normal power levels. Since each additional watt of power may increase the overall cost of operating machine 105, the operator of machine 105 may want to keep overall power as low as possible.

In addition, every additional watt of power may translate into increased heat within (or without) machine 105. Since excess heat may damage electronics, there are two possible approaches to keeping heat to a minimum. One solution is to compensate for the heat using a cooling system. But a cooling system itself draws some power, which leads to additional cost. The other solution is to avoid the heat being generated in the first place: lowering the power consumed by components in machine 105 may reduce the overall heat produced by machine 105.

But while components, such as memory 115 or storage device 120, may be able to operate at lower power levels, such components may operate more efficiently at higher power levels. For example, at 12 W storage device 120 may have sufficient power to process read or write requests. But 12 W might only provide enough power for one read/write circuit in storage device 120, whereas 14 W might provide enough power for two read/write circuits in storage device 120. With the additional power, storage device 120 might be able to process more requests in a given amount of time, reducing its latency: for example, by processing more read or write requests in a given unit of time or by increasing the parallelism offered by storage device 120.

This lowering of the operating efficiency by lowering the power used by storage device 120 may similarly extend to its boot process. That is, at its normal power level, storage device 120 may boot, but it might take, say, 20 seconds to complete the boot process. By increasing the amount of power to, say, 14 W, it might be possible for storage device 120 to boot in, say, five seconds. The increased power may be used, for example, to increase the clock rates for the storage device controller, any DRAM in storage device 120, the number of reads or writes active to the storage medium, and/or the channels used to communicate with the storage in storage device 120.

Saving 15 seconds might not seem like a lot of time, particularly when contrasted with the fact that machine 105 may be expected to run continuously for days, weeks, months, or longer at a time without being powered down. But with all the components in machine 105, it might take 20 minutes or more for machine 105 to complete its boot process. As "time is money", that 20 minutes might be time in which machine 105 may be unavailable to service requests from a client, which would mean that the operator of machine 105 would not be earning revenue from the operation of machine 105. Again, 20 minutes might seem a small amount of time when contrasted with machine 105 potentially running continuously for many months. But for a client who is waiting for an answer to a query, even a few seconds delay might be considered annoying: a 20 minute delay might be considered completely unacceptable. Further, the operator of machine 105 might have promised service level agreements to its clients: these service level agreements might be violated if the client has to wait 20 minutes for machine 105 to boot. Thus, expediting the availability of machine 105 by even a few minutes or seconds may be important.

One way machine 105 may expedite the boot process is by permitting storage units to boot using more than the normal power level of the storage unit. Recall that power supply 135 may be a little larger than absolutely necessary given the components in machine 105, or power supply 135 may be tolerate limited overdraws in power. Machine 105 may thus offer some (or all) of that excess power to individual storage devices (either at the same time or sequentially) to expedite their individual boot times.

In addition, booting storage device 120 typically occurs when machine 105 is cool. Because machine 105 may be cool, excess heat due to storage units drawing power in excess of their normal power levels is less of a concern: storage units may use additional power to boot more quickly with less potential impact on the overall temperature within (or without) machine 105.

To that end, machine 105 may include selection circuit 140, which may determine a boot order for devices, such as memory 115 and storage device 120, in machine 105. Selection circuit 140 may use information about the power consumption of various components, such as processor 110, memory 115, and storage device 120, in machine 105, as well as power such components might prefer to use to boot. Selection circuit 140 may also be used to determine how much power each storage unit may use to boot, as well as the duration for which each storage unit may use such power levels before the storage unit is expected to return to its normal specifications.

As an example, assume that machine 105 includes two storage devices 120, one of which would prefer to use 14 watts (W) to boot, and the other of which would prefer to use 13 W to boot. Selection circuit 120 may determine that booting the 14 W storage device first, permitting that storage device to use 14 W to boot, is preferable to the objective of keeping instantaneous power consumption as low as possible (since once a component is booted, it may continue to draw power) while attempting to expedite the overall boot process, after which the other storage device may boot using 13 W. Once each storage device has completed its boot process, each storage device may return to using its normal power level.

Machine 105 may also include transmitter 145 and receiver 150. Transmitter 145 and receiver 150 may be used to communicate with memory 115 and/or storage device 120 with respect to their boot operations, (although transmitter 145 and/or receiver 150 may be used for other purposes as well). Transmitter 145 may include write circuit 155, which may be used to write data into storage, such as a register, in memory 115 and/or storage device 120. In a similar manner, receiver 150 may include read circuit 160, which may be used to read data from storage, such as a register, in memory 115 and/or storage device 120.

Finally, machine 105 may include timer 165. Timer 165 may be used to time how long storage device 120 has to boot. For example, consider again the situation where machine 105 includes two storage devices 120. Selection circuit 140 may determine that the first storage device, which would prefer 14 W to boot, may have 14 W, but only for, say, three seconds, after which the storage device may return to its normal power level. Timer 165 may track how much time the storage device has used to boot, after which its power consumption should return to its normal power level. Once the first storage device has had its allotted amount of time (three seconds), selection circuit 140 may select the second power device, which would prefer 13 W to boot, to boot using 13 W, but only for, say, two seconds. Once the two seconds, as measured by timer 165, has elapsed, selection circuit 140 may select another component to boot. In this manner, machine 105 may boot components sequentially, providing each component with additional power to expedite its boot process, but without overall power consumption exceeding the maximum amount of power offered by power supply 135.

Figure 2:
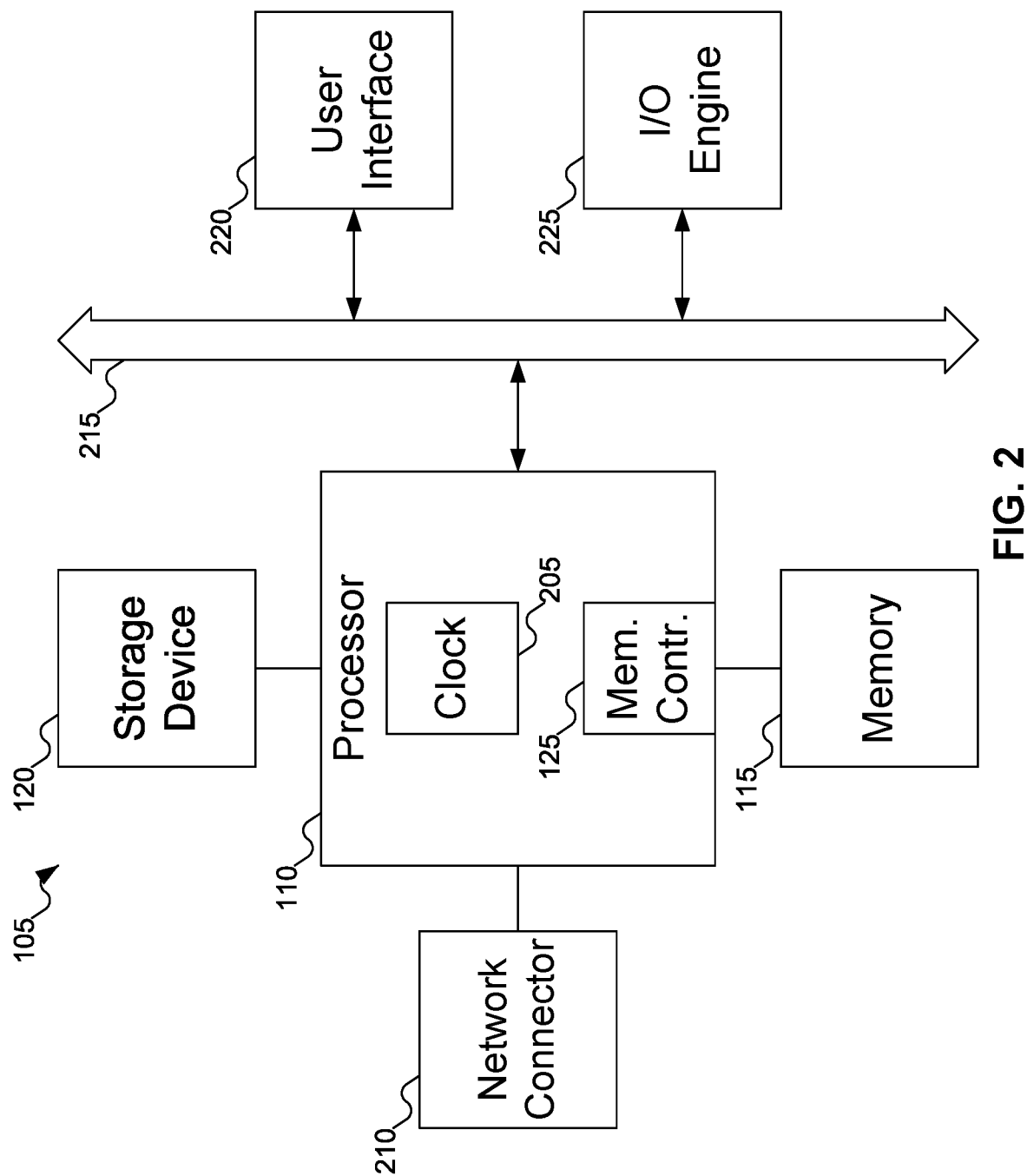
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
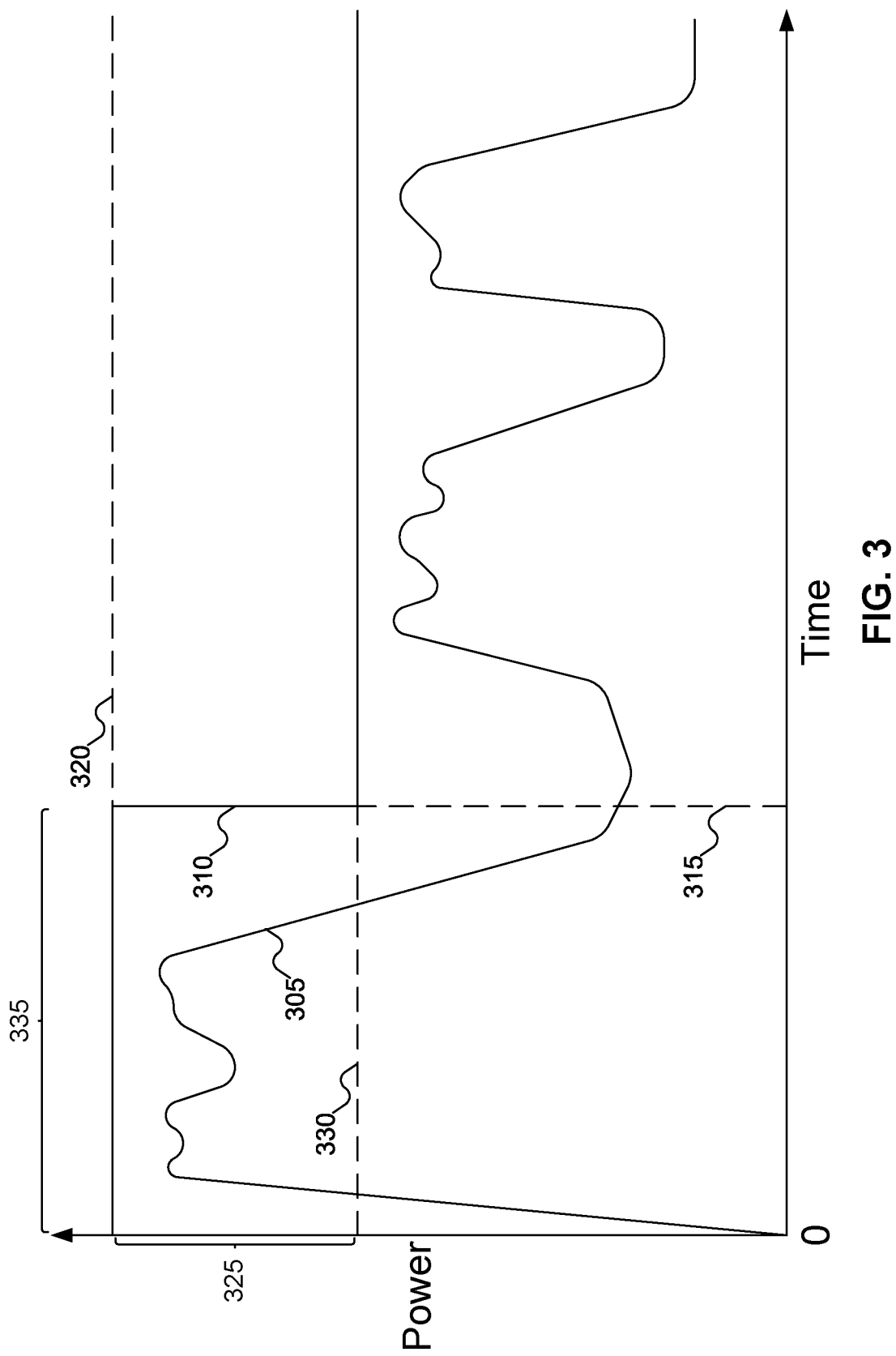
FIG. 3 shows an example power curve for the storage device of FIG. 1, according to embodiments of the disclosure.

FIG. 3 shows an example power curve for storage device 120 of FIG. 1, according to embodiments of the disclosure. As discussed above with reference to FIG. 1, during boot operations, storage device 120 of FIG. 1 may be permitted to use some additional power; after an interval, storage device 120 of FIG. 1 may be expected to return to using just the steady state power level (whatever is permitted within machine 105).

In FIG. 3, power curve 305 shows an example power drawn by storage device 120 of FIG. 1 over time, as it boots (starting at time 0) and then processes requests from processor 110 of FIG. 1. Power curve 305 may be bounded by shape 310, which may represent the power machine 105 of FIG. 1 may permit storage device 120 of FIG. 1 to use.

Rather than being a flat and level line, shape 310 is shown as a step pattern. Thus, from time 0 until time 315, storage device 120 of FIG. 1 may use power up to boot power level 320; after time 315, storage device 120 of FIG. 1 may use power up to power level 310. In other words, during the boot process, storage device 120 of FIG. 1 may use extra power 325 (the difference between power levels 320 and 330) for duration 335 (the span from time 0 to time 315).

While FIG. 3 shows shape 310 as a step pattern, in some embodiments of the disclosure the shape may focus on the interval of duration 335. Put another way, shape 310 may only describe the interval during which storage device 120 of FIG. 1 is not expected to stay within power level 330 (its steady state power level for machine 105), which may be the default operation of storage device 120 of FIG. 1.

While FIG. 3 shows shape 310 as a step pattern (or a rectangle, considering the area bounded by power levels 320 and 330, time 0, and time 315), embodiments of the disclosure may include other shapes. Examples of other shapes that may be used include a double rectangle (a brief high power level followed by a longer intermediate power level), a triangle (a linear progression from boot power level 320 to power level 330 over duration 335, or a curve (progressing from boot power level 320 to power level 330 over duration 335 but not using a linear progressing: for example, a quadratic or higher equation, or an arc of some sort).

Figure 4:
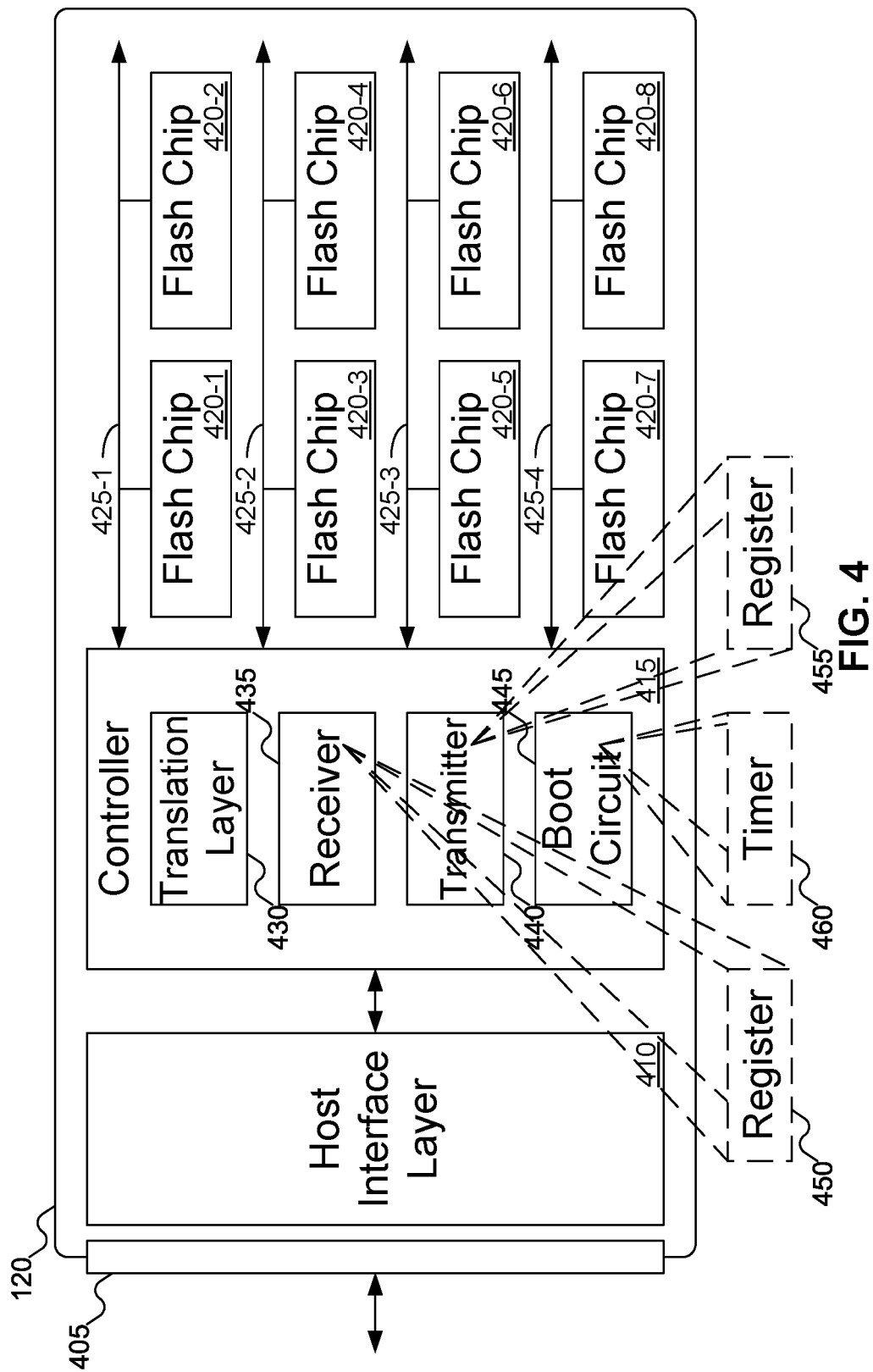
FIG. 4 shows details of the storage device of FIG. 1, according to embodiments of the disclosure.

FIG. 4 shows details of storage device 120 of FIG. 1, according to embodiments of the disclosure. In FIG. 4, the implementation of storage device 120 is shown as for a Solid State Drive. In FIG. 4, storage device 120 may include interface 405, host interface layer (HIL) 410, controller 415, and various flash memory chips 420-1 through 420-8 (also termed "flash memory storage"), which may be organized into various channels 425-1 through 425-4. Interface 405 may be the physical interface used to connect storage device 120 to other components of machine 105 of FIG. 1, and may include, for example, a Peripheral Component Interconnect Express (PCIe) interface, a Compute Express Link (CXL) interface, a U.2 interface, a U.3 interface, or a M.2 interface, among other possibilities.

Host interface layer 410 may manage communications between storage device 120 and other components (such as processor 110 of FIG. 1) across interface 405. Host interface layer 410 may also manage communications with devices remote from storage device 120: perhaps over one or more network connections. These communications may include read requests to read data from storage device 120, write requests to write data to storage device 120, and delete requests to delete data from storage device 120.

Host interface layer 410 may manage interface 405 with only one port, or it may manage interface 405 across multiple ports. In addition, host interface layer 410 may manage multiple interfaces 405, if storage device 120 includes such multiple interfaces. Alternatively, storage device 120 may include multiple ports, each of which may have a separate host interface layer 410 to manage communications across that port. Embodiments of the disclosure may also mix the possibilities (for example, an SSD with three ports might have one host interface layer to manage one port and a second host interface layer to manage the other two ports).

Controller 415 may manage the read and write operations, along with garbage collection and other operations, on flash memory chips 420-1 through 420-8. SSD controller 415 may include translation layer 430, receiver 435, transmitter 440, and boot process 445. Translation layer 430 may manage the mapping of logical addresses, as used by host 105 of FIG. 1, to physical addresses where the data is actually stored on storage device 120. By using translation layer 430, host 105 of FIG. 1 does not need to be informed when data is moved from one physical address to another within storage device 120.

Receiver 435 may be used, among other possible purposes, to manage information received from machine 105 of FIG. 1 regarding boot power. This information may include, for example, requests for the preferred boot power data for storage device 120, or the boot power data sent from machine 105 of FIG. 1 (and to be used by storage device 120 to boot). Transmitter 440 may be the mirror of receiver 435, sending information to machine 105 of FIG. 1 identifying what boot power data storage device 120 would prefer.

Receiver 435 and transmitter 440 may use registers 450 and 455 to receive and send data to and from machine 105 of FIG. 1. That is, transmitter 145 of FIG. 1 may write data into register 450, and receiver 150 of FIG. 1 may read data from register 455. While FIG. 4 shows registers 450 and 455 as separate registers, embodiments of the disclosure may combine registers 450 and 455 into a single register used for both sending and receiving information. Alternatively, receiver 435 and transmitter 440 may use sideband signaling to communicate with transmitter 145 of FIG. 1 and receiver 150 of FIG. 1. Receiver 435 and transmitter 440 may use any desired bus or means of communication for sideband signaling, such as a system management bus (SMBus), a PCIe bus, PCIe vendor device messages (VDM), Vital Product Data (VPD), an NVMe management interface, or through a protocol for setting features.

Finally, boot process 445 may manage the boot process of storage device 120. Once receiver 435 has received boot power data from transmitter 145 of FIG. 1, boot process 445 may boot storage device 120 based on that boot power data. As described with reference to FIG. 3 above, the boot power data may include shape 310 of FIG. 3, which may permit storage device 120 to use boot power level 320 of FIG. 3 for duration 335 of FIG. 3, after which storage device 120 is expected to return to power level 330 of FIG. 3. To that end, boot process 445 may include timer 460, which may track how long storage device 120 has used boot power level 320 of FIG. 3, to ensure that storage device 120 returns to power level 330 of FIG. 3 when expected by machine 105 of FIG. 1.

In some embodiments of the disclosure, boot process 445 may be implemented within storage device 120; in other embodiments of the disclosure, boot process 445 may be operated on a separate processor communicating with storage device 120. For example, boot process 445 may be operated on processor 110 of FIG. 1 or some other processor not shown in FIG. 1 or 4. Further, boot process 445 may communicate with storage device 120 using any desired communications channel: for example, sideband signaling, as described above.

In some embodiments of the disclosure, machine 105 of FIG. 1 and storage device 120 may negotiate what boot power level and what duration storage device 120 may use each time storage device 120 boots in a cold server. In other embodiments of the disclosure, storage device 120 may store the boot power level and duration, and may use that information every time storage device 120 boots until machine 105 of FIG. 1 sets a new power level and/or duration. In such embodiments of the disclosure, boot process 445 may include a register (not shown in FIG. 4, but which may be the same register as registers 450 and/or 455) to store such information for future boot operations.

While FIG. 4 shows storage device 120 as including eight flash memory chips 420-1 through 420-8 organized into four channels 425-1 through 425-4, embodiments of the inventive concept may support any number of flash memory chips organized into any number of channels. Similarly, while FIG. 4 shows the structure of a SSD, other storage devices (for example, hard disk drives) may be implemented using a different structure from that shown in FIG. 4 to manage reading and writing data, but with similar potential benefits.

For enterprise customers, the customer might specify the power level storage device 120 is expected to use to boot: storage device 120 may then be designed to boot using that power level for the described length of time. But in a more general situation—for example, for customers who are not enterprise customers, customers who are not as concerned with the power storage device 120 might use to boot, or customers who have multiple deployment environments—storage device 120 may be validated to boot using various power levels in various amounts of time. Selection logic 140 of FIG. 1 might request such information from storage device 120, which may store such information in a table.

Figures 5, 6:
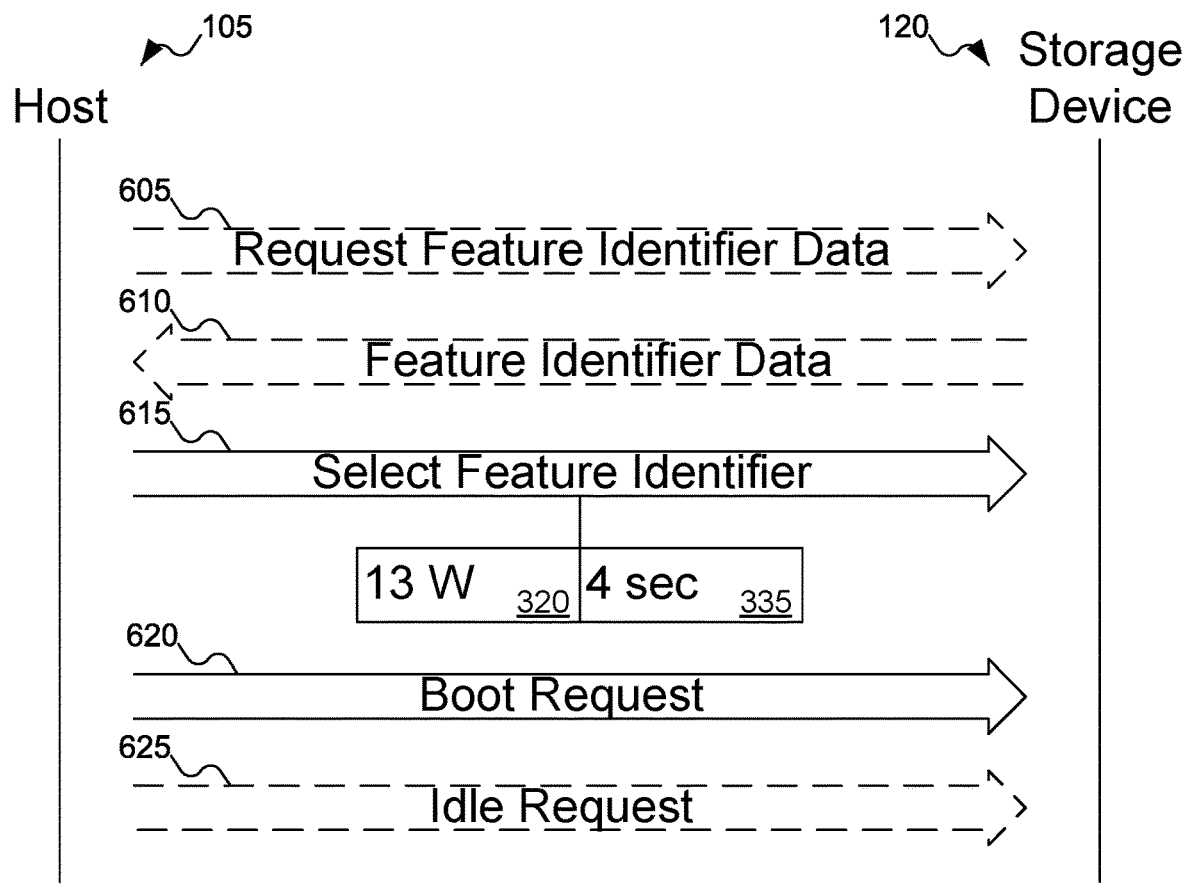
FIG. 5 shows an example table of different power levels the storage device of FIG. 1 might use, according to an embodiment of the disclosure.
FIG. 6 shows an example exchange between the machine of FIG. 1 and the storage device of FIG. 1 to manage boot power levels, according to an embodiment of the disclosure.

FIG. 5 shows an example table of different power levels storage device 120 of FIG. 1 might use, according to an embodiment of the disclosure. In FIG. 5, table 505 is shown. Table 505 includes information such as power levels 510 and durations 515. That is, storage device 120 of FIG. 1 may have been validated to boot in duration 515 given power level 510. So, for example, boot power data 520-1 reflects that storage device 120 of FIG. 1 may boot in 1 second given 14 W of power, boot power data 520-2 reflects that storage device 120 of FIG. 1 may boot in 4 seconds given 13 W of power, boot power data 520-3 reflects that storage device 120 of FIG. 1 may boot in 10 seconds given 12.5 W of power, and boot power data 520-4 reflects that storage device 120 of FIG. 1 may boot in an unlimited amount of time (shown as ∞) given 12 W of power. Boot power data 520-1 through 520-4 may be referred to collectively as boot power data 520.

Boot power data 520-4 may reflect the default steady state power level for storage device 120 of FIG. 1. That is, by default storage device 120 of FIG. 1 may operate using boot power data 520-4. But any boot power data 520 may be identified as the default boot power data: using boot power data 520-4 above as the default boot power data is merely an example. Later, machine 105 of FIG. 1 may set a different boot power data as the default to use in future boot processes. In some embodiments of the disclosure, machine 105 of FIG. 1 may identify a boot power data during a low power identification stage of the boot process: for example, through sideband signaling.

Note that while storage device 120 of FIG. 1 might be validated for boot power data 520, that fact does not mean that storage device 120 is necessarily limited to booting according to a boot power data in table 505. For example, in some embodiments of the disclosure storage device 120 of FIG. 1 might be able to determine how to use a different power level: for example, by interpolating based on power levels in table 505. But in some embodiments of the disclosure, storage device 120 of FIG. 1 may be limited to booting using only power levels 510. In such embodiments of the disclosure, if machine 105 of FIG. 1 instructs storage device 120 of FIG. 1 to boot using a power level not in a boot power data in table 505, storage device 120 may use the highest power level in a boot power data in table 505, even if that power level is less than boot power level 320 of FIG. 3. Put another way, boot power level 320 of FIG. 3 represents an upper bound on the power used by storage device 120 of FIG. 1, but storage device 120 of FIG. 1 is not obliged to use that amount of power.

Table 505 may also include identifier 525. Identifier 525 may be used to identify a particular boot power data in table 505. Transmitter 145 of FIG. 1 may then use identifier 525 to identify a particular boot power level that storage device 120 of FIG. 1 may use, rather than specifying power level 510 and duration 515 specifically. Thus, for example, as boot power data 520-4 may represent the default steady state power level for storage device 120 of FIG. 1, storage device 120 of FIG. 1 may store identifier D somewhere to identify boot power data 520-4 as the boot power data to be used when storage device 120 of FIG. 1 next boots.

In some embodiments of the disclosure, each storage device 120 of FIG. 1 in machine 105 of FIG. 1 may have the same boot power data. That is, if machine 105 of FIG. 1 includes two or more storage devices 120 of FIG. 1, both storage devices might use the same boot power data. But in other embodiments of the disclosure, different storage devices might use different boot power data. For example, a storage device that is booted earlier in the power-up of machine 105 of FIG. 1 might use, for example, boot power data 520-1, whereas a storage device that is booted later in the power-up of machine might use, for example, boot power data 520-4. In this manner, storage devices that are booted where the available excess power is higher may benefit from that available power, while storage devices that are booted when there is less (or no) available excess power may boot without using excess power.

In some embodiments of the disclosure, machine 105 of FIG. 1 may know the information in table 505, without storage device 120 of FIG. 1 having to provide this information to machine 105 of FIG. 1 (using, for example, transmitter 440 of FIG. 4). In such embodiments of the disclosure, transmitter 145 of FIG. 1 may use identifier 525 to identify boot power data 520 that storage device 120 of FIG. 1 should use in booting.

FIG. 6 shows an example exchange between machine 105 of FIG. 1 and storage device 120 of FIG. 1 to manage boot power levels, according to an embodiment of the disclosure. In FIG. 6, machine 105 may send request 605 to storage device 120, requesting a feature identifier of storage device 120. This feature identifier may be, for example, identifier 525 of FIG. 5 of boot power data 520 of FIG. 5 or the information in table 505 of FIG. 5, among other possibilities. Request 605 may be omitted if machine 105 already knows the information in table 505 of FIG. 5, or if machine 105 may select the boot power data for storage device 120 without reference to table 505 of FIG. 5, which is why request 605 is shown with dashed lines.

Assuming that machine 105 issues request 605, storage device 120 may respond with the feature identifier(s)—for example, boot power data 520 of FIG. 5—in response 610. Since request 605 may be omitted, response 610 may also be omitted, which is why response 610 is shown with dashed lines.

At some point, machine 105 may determine boot power data 615, and may send feature identifier 615, which may identify the boot power data to use, to storage device 120. As shown in FIG. 6, boot power data 615 may include boot power level 320 and duration 335, specifying how much power storage device 120 may use to boot and for how long, before storage device 120 may be expected to return to its normal power level. While FIG. 6 shows boot power data 615 as including boot power level 320 and duration 335, as discussed with reference to FIG. 5 above, boot power data 615 might include identifier 525 of FIG. 5 instead, which storage device 120 may use to determine boot power level 320 and duration 335 from table 505 of FIG. 5.

At some point, machine 105 may send boot request 620 to storage device 120, instructing storage device 120 to begin its boot process. Storage device 120 may then boot using boot power level 320 and duration 335 as specified in or represented by boot power data 615. Note that boot power data 615 and boot request 620 may be combined into a single communication: they are not required to be separate communications.

Finally, at some point, machine 105 may send idle request 625 to storage device 120, instructing storage device 120 to enter an idle state. In an idle state, storage device 120 is booted but drawing less power than normal power level 330 of FIG. 3 (and therefore might not be drawing sufficient power to process read or write requests from processor 110 of FIG. 1). By placing storage device 120 in an idle state, machine 105 may have additional power that might be used by other storage devices or components to boot later.

Figure 7:
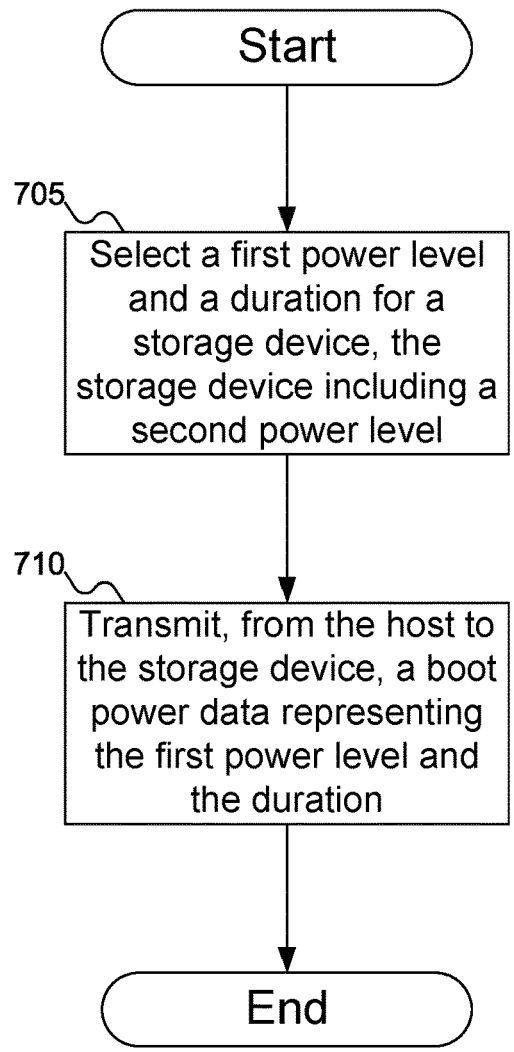
FIG. 7 shows a flowchart of an example procedure for the machine of FIG. 1 to inform the storage device of FIG. 1 how it may boot, according to embodiments of the disclosure.

FIG. 7 shows a flowchart of an example procedure for machine 105 of FIG. 1 to inform storage device 120 of FIG. 1 how it may boot, according to embodiments of the disclosure. In FIG. 7, at block 705, selection circuit 140 of FIG. 1 may select boot power level 320 of FIG. 3 and duration 335 of FIG. 3 for storage device 120 of FIG. 1. Storage device 120 of FIG. 1 might have normal power level 330 of FIG. 3, so boot power level 320 of FIG. 3 may be an increased amount of power over normal power level 330 of FIG. 3. At block 710, transmitter 145 of FIG. 1 may transmit boot power data 615 of FIG. 6 to storage device 120 of FIG. 1. Boot power data 615 of FIG. 6 may specify boot power level 320 of FIG. 3 and duration 335 of FIG. 3, or boot power data 615 of FIG. 6 may represent boot power level 320 of FIG. 3 and duration 335 of FIG. 3: for example, by using identifier 525 of FIG. 5.

Figure 8:
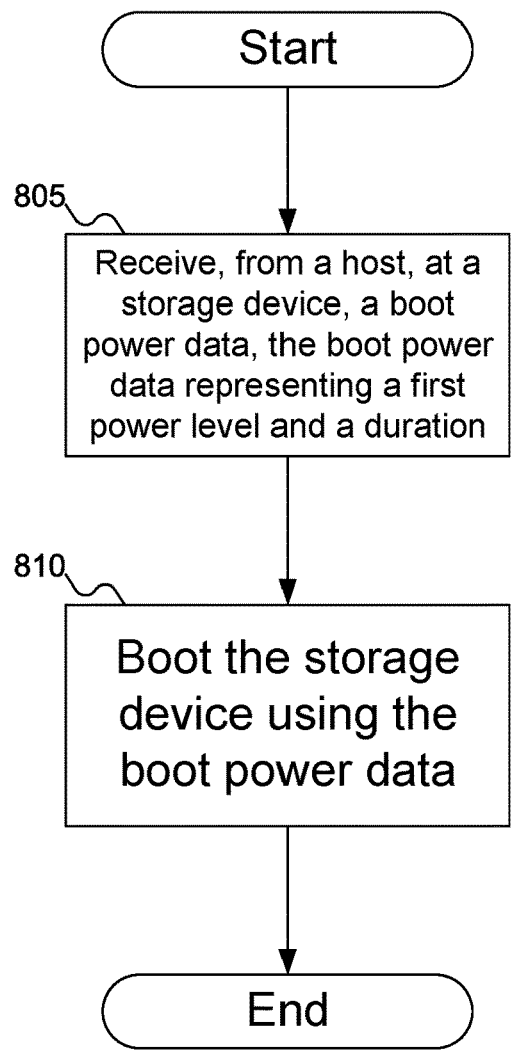
FIG. 8 shows a flowchart of an example procedure for the storage device of FIG. 1 to boot based on the information received from the machine of FIG. 1, according to embodiments of the disclosure.

FIG. 8 shows a flowchart of an example procedure for storage device 120 of FIG. 1 to boot based on the information received from machine 105 of FIG. 1, according to embodiments of the disclosure. In FIG. 8, at block 805, receiver 435 of FIG. 4 may receive from machine 105 of FIG. 1 boot power data 615 of FIG. 6. Boot power data 615 may specify boot power level 320 of FIG. 3 and duration 335 of FIG. 3, or boot power data 615 of FIG. 6 may represent boot power level 320 of FIG. 3 and duration 335 of FIG. 3: for example, by using identifier 525 of FIG. 5. At block 810, boot process 445 may then boot storage device 120 of FIG. 1 using boot power data 615 of FIG. 6.

Figure 9:
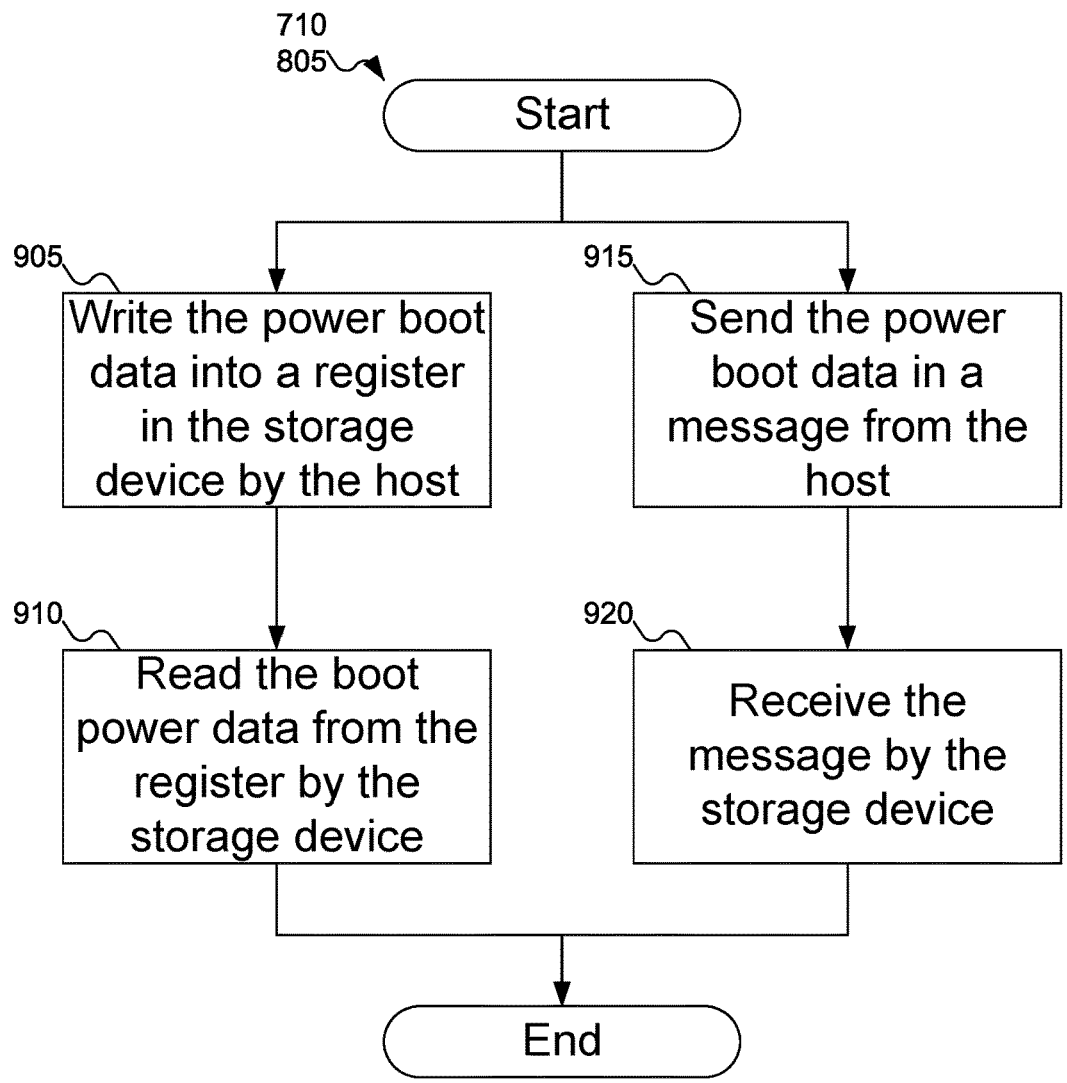
FIG. 9 shows a flowchart of an example procedure for the machine of FIG. 1 to inform the storage device of FIG. 1 of its allowed boot power level, according to embodiments of the disclosure.

FIG. 9 shows a flowchart of an example procedure for machine 105 of FIG. 1 to inform storage device 120 of FIG. 1 of its allowed boot power level, according to embodiments of the disclosure. In FIG. 9, at block 905, write circuit 155 of FIG. 1 may write boot power data 615 of FIG. 6 into register 450 of FIG. 4, and at block 910, receiver 435 of FIG. 4 may read boot power data 615 of FIG. 6 from register 450 of FIG. 4. Alternatively, at block 915, transmitter 145 of FIG. 1 may send boot power data 615 of FIG. 6 to receiver 435 of FIG. 4: for example, via sideband signaling, and at block 920, receiver 435 of FIG. 4 may receive boot power data 615 of FIG. 6. Note that, in either path, storage device 120 of FIG. 1 may store boot power data 615 of FIG. 6 in non-volatile storage, so that boot power data 615 of FIG. 6 may be used by default in future boot processes of storage device 120 (unless or until changed by machine 105 of FIG. 1).

Figure 10:
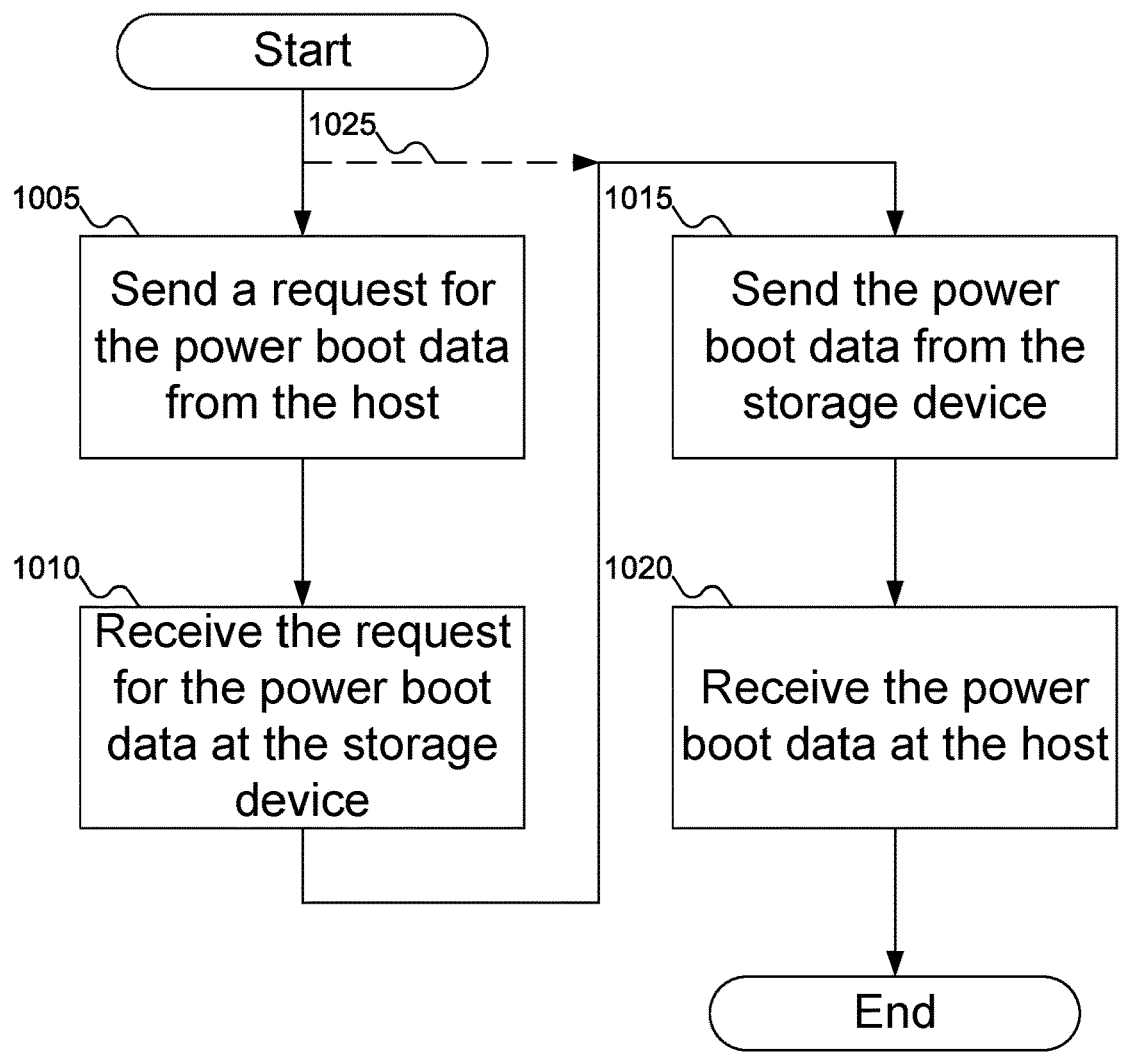
FIG. 10 shows a flowchart of an example procedure for the machine of FIG. 1 to receive information about boot power levels the storage device of FIG. 1 may use, according to embodiments of the disclosure.

FIG. 10 shows a flowchart of an example procedure for machine 105 of FIG. 1 to receive information about boot power levels storage device 120 of FIG. 1 may use, according to embodiments of the disclosure. In FIG. 10, at block 1005, transmitter 145 of FIG. 1 may send request 605 of FIG. 6 to storage device 120 of FIG. 1 for boot power data 520 of FIG. 5. At block 1010, receiver 435 of FIG. 4 may receive request 605 of FIG. 6 from machine 105 of FIG. 1. At block 1015, transmitter 440 of FIG. 4 may send boot power data 520 of FIG. 5 to machine 105 of FIG. 1. Finally, at block 1020, receiver 150 of FIG. 1 may receive boot power data 520 of FIG. 5 from storage device 120 of FIG. 1.

In some embodiments of the disclosure, storage device 120 of FIG. 1 may send boot power data 520 of FIG. 5 to machine 105 of FIG. 1, even without boot power data 520 of FIG. 5 being requested by machine 105 of FIG. 1. This situation may arise, for example, if storage device 120 is not aware of what power level and/or duration machine 105 of FIG. 1 permits storage device 120 of FIG. 1 to use, but storage device 120 of FIG. 1 may provide boot power data 520 of FIG. 5 without request in other situations as well. In such embodiments of the disclosure, blocks 1005 and 1010 may be omitted, as shown by dashed line 1025.

Figure 11:
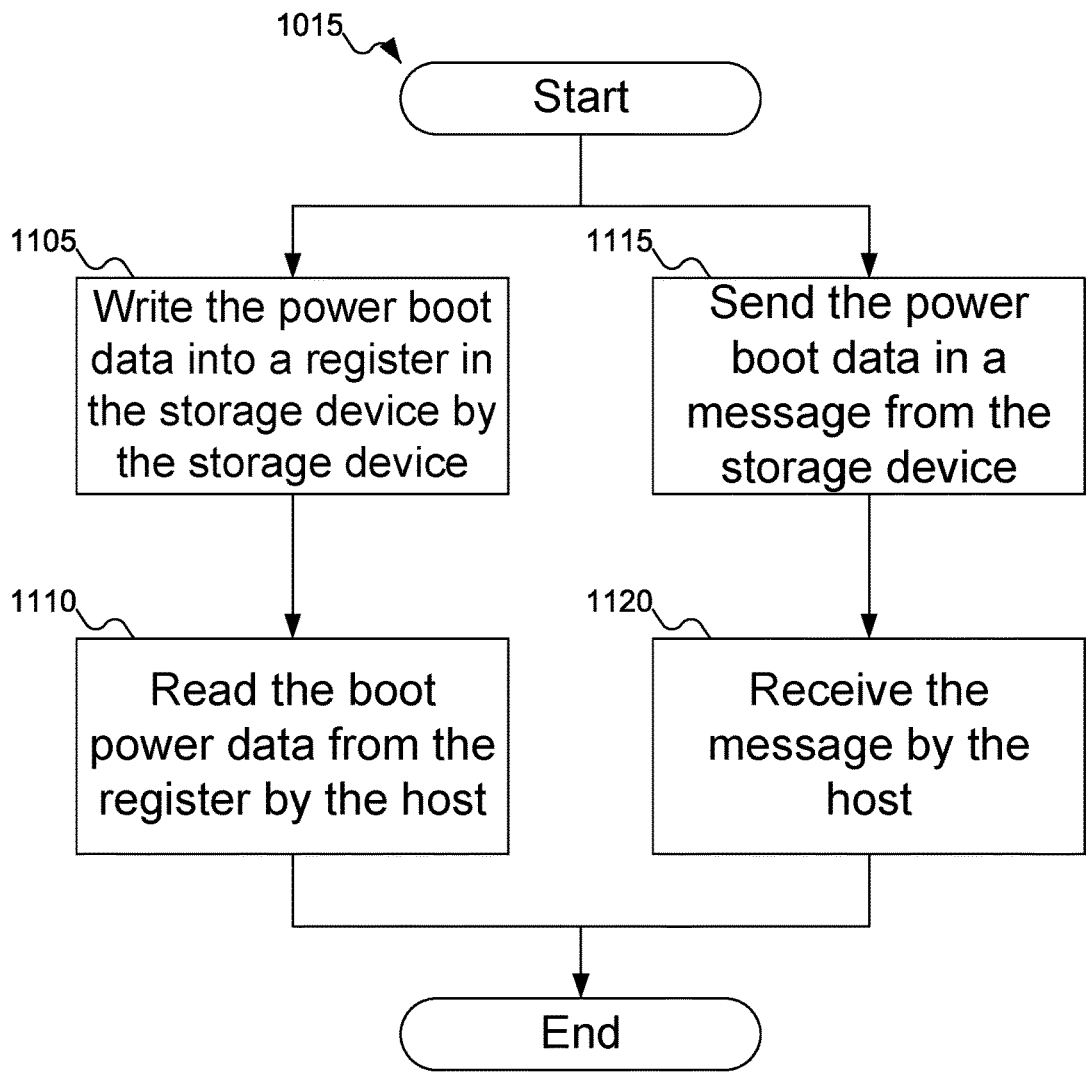
FIG. 11 shows a flowchart of an example procedure for the storage device of FIG. 1 to inform the machine of FIG. 1 of boot power levels the storage device of FIG. 1 may use, according to embodiments of the disclosure.

FIG. 11 shows a flowchart of an example procedure for storage device 120 of FIG. 1 to inform machine 105 of FIG. 1 of boot power levels storage device 120 of FIG. 1 may use, according to embodiments of the disclosure. In FIG. 11, at block 1105, transmitter 440 of FIG. 4 may write boot power data 520 of FIG. 5 into register 455 of FIG. 4, and at block 1110, read circuit 160 of FIG. 1 may read boot power data 520 of FIG. 5 from register 455 of FIG. 4. Alternatively, at block 1115, transmitter 440 of FIG. 4 may send boot power data 520 of FIG. 5 to receiver 150 of FIG. 1: for example, via sideband signaling, and at block 1120, receiver 150 of FIG. 1 may receive boot power data 520 of FIG. 5.

Figure 12A:
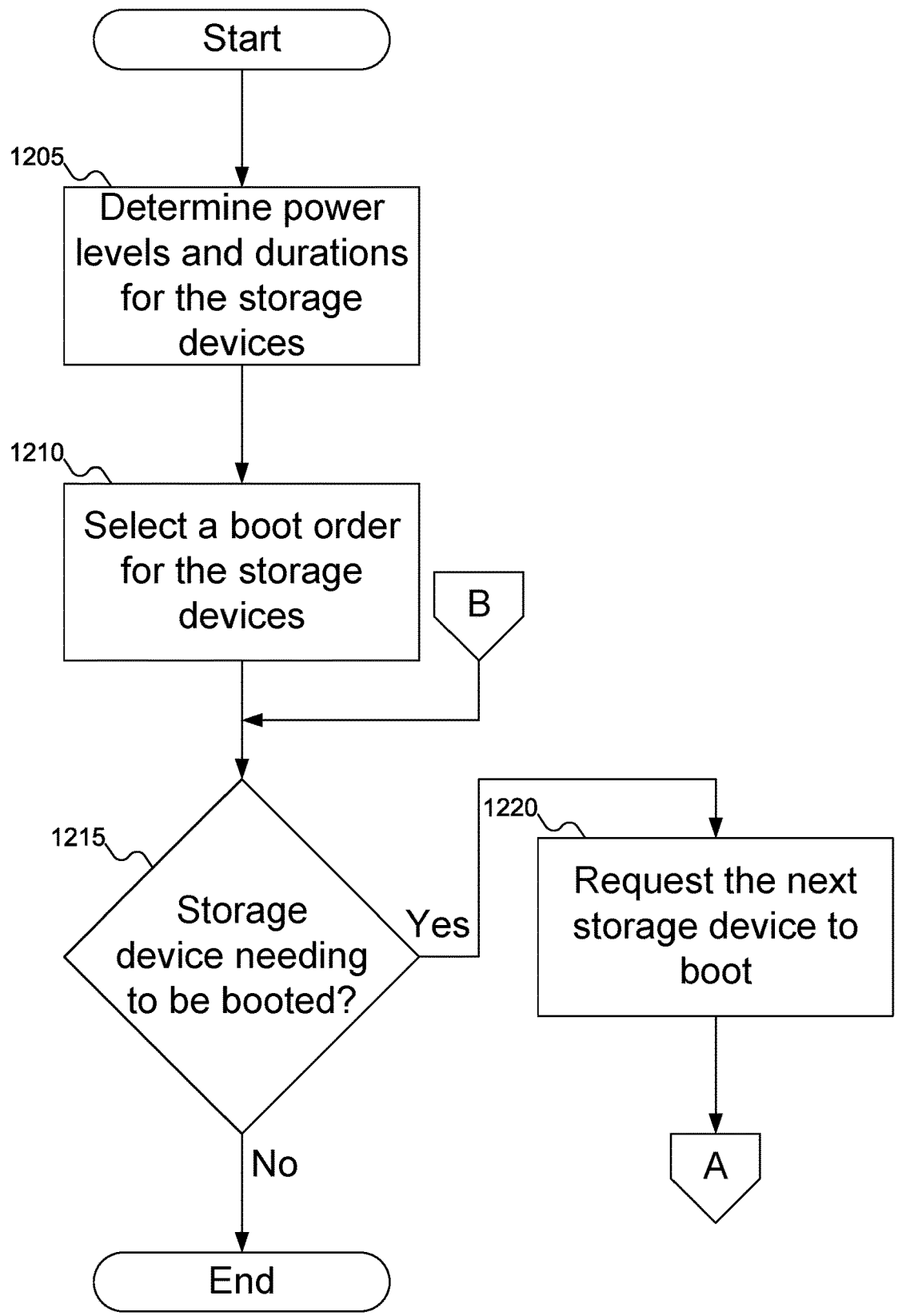
FIG. 12A shows a flowchart of an example procedure for the machine of FIG. 1 to instruct the storage device of FIG. 1 to boot, according to embodiments of the disclosure.
Figure 12B:
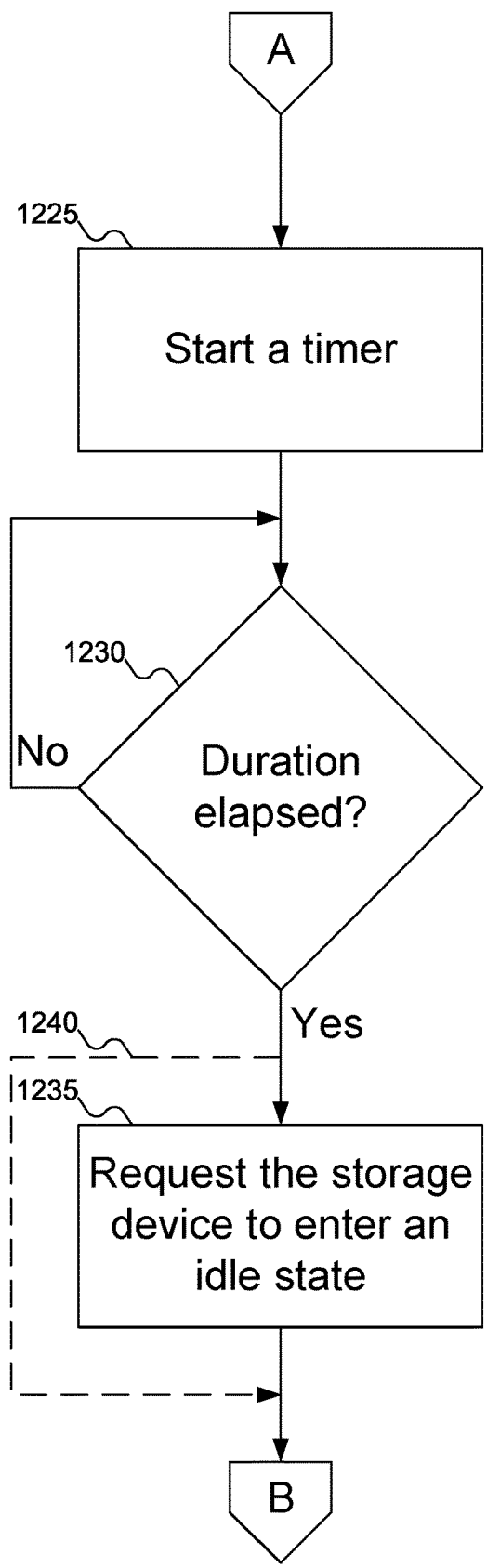
FIG. 12B continues the flowchart of the example procedure of FIG. 12A for the machine of FIG. 1 to instruct the storage device of FIG. 1 to boot, according to embodiments of the disclosure.

FIGS. 12A-12B show a flowchart of an example procedure for machine 105 of FIG. 1 to instruct storage device 120 of FIG. 1 to boot, according to embodiments of the disclosure. In FIG. 12A, at block 1205, selection circuit 140 of FIG. 1 may determine boot power level 320 of FIG. 3 and/or duration 335 of FIG. 3 for storage devices 120 of FIG. 1 (and/or other components in machine 105 of FIG. 1). At block 1210, selection circuit 140 of FIG. 1 may select a boot order for storage devices 120 of FIG. 1 (and/or other components in machine 105 of FIG. 1).

At block 1215, machine 105 of FIG. 1 may determine that storage device 120 of FIG. 1 needs to be booted. At block 1220, transmitter 145 of FIG. 1 may send boot request 620 of FIG. 6 to storage device 120 of FIG. 1. At block 1225 (in FIG. 12B), machine 105 of FIG. 1 may start timer 165 of FIG. 6 to measure duration 335 of FIG. 3. At block 1230, machine 105 of FIG. 1 may determine if duration 335 of FIG. 3 has elapsed, as measured by timer 165 of FIG. 1. If not, machine 105 of FIG. 1 may continue to wait until duration 335 of FIG. 3 has elapsed, as measured by timer 165 of FIG. 1. Once duration 335 of FIG. 3 has elapsed, as measured by timer 165 of FIG. 1, machine 1235 may send idle request 625 of FIG. 6 to storage device 120. Block 1235 may be omitted, as shown by dashed line 1240. Control may then return to block 1215 of FIG. 12A to determine if any other storage devices (or other components of machine 105 of FIG. 1) need to be booted.

Figure 13:
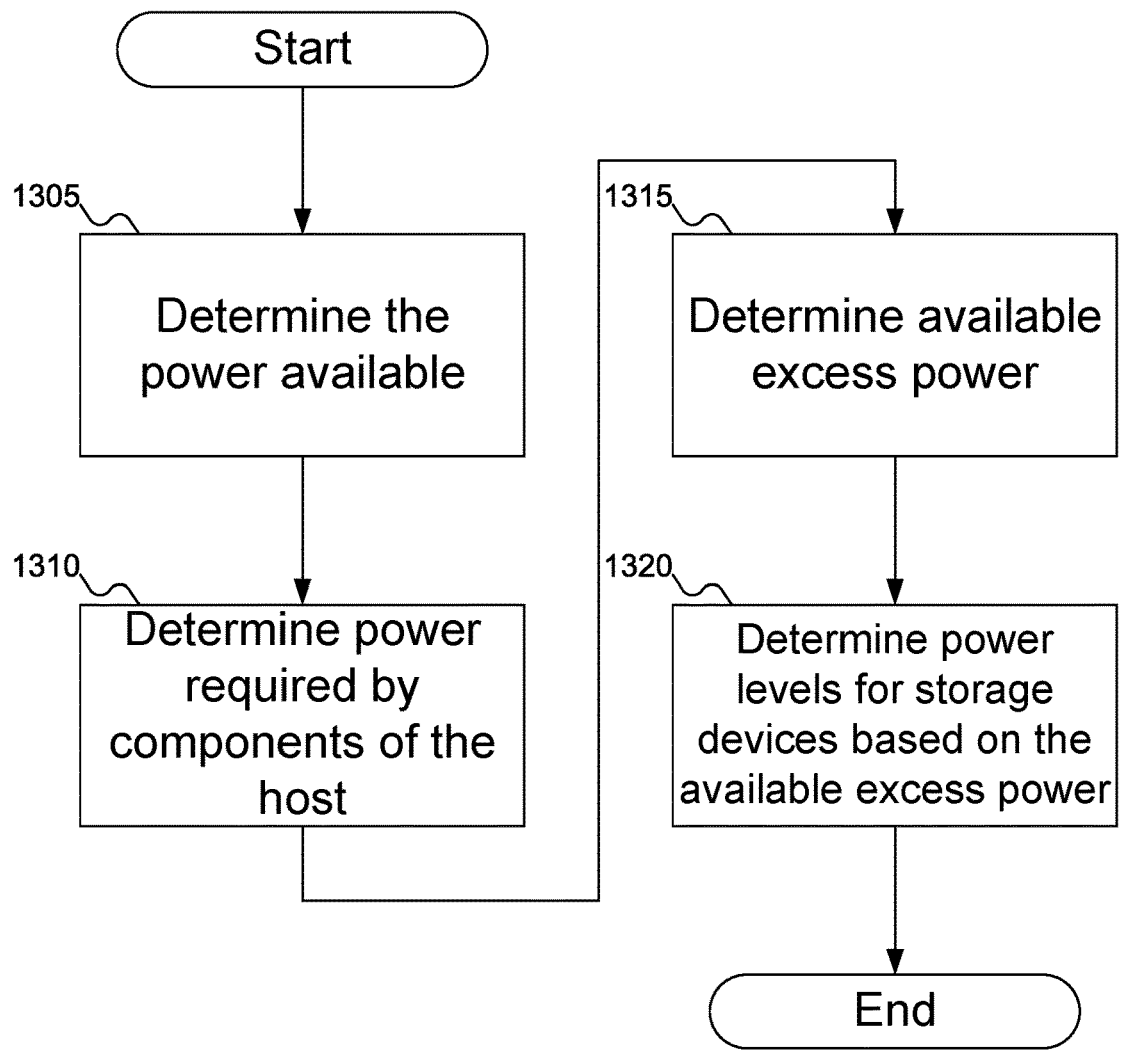
FIG. 13 shows a flowchart of an example procedure for the machine of FIG. 1 to determine the boot power level the storage device of FIG. 1 may use, according to embodiments of the disclosure.

FIG. 13 shows a flowchart of an example procedure for machine 105 of FIG. 1 to determine the boot power level storage device 120 of FIG. 1 may use, according to embodiments of the disclosure. In FIG. 13, at block 1305, machine 105 of FIG. 1 may determine the power available from power supply 135 of FIG. 1. At block 1310, machine 105 of FIG. 1 may determine the normal power levels of storage device 120 of FIG. 1, processor 110 of FIG. 1, and other components in machine 105 of FIG. 1. At block 1315, machine 105 of FIG. 1 may determine what excess power is available: for example, by summing the normal power levels of storage device 120 of FIG. 1, processor 110 of FIG. 1, and other components in machine 105 of FIG. 1, and subtracting that sum from the power available from power supply 135 of FIG. 1. Using this available excess power, selection circuit 140 may then determine boot power level 320 of FIG. 3 and/or duration 335 of FIG. 3 for storage device 120 of FIG. 1, as well as boot power levels and durations for other components in machine 105 of FIG. 1.

Figure 14A:
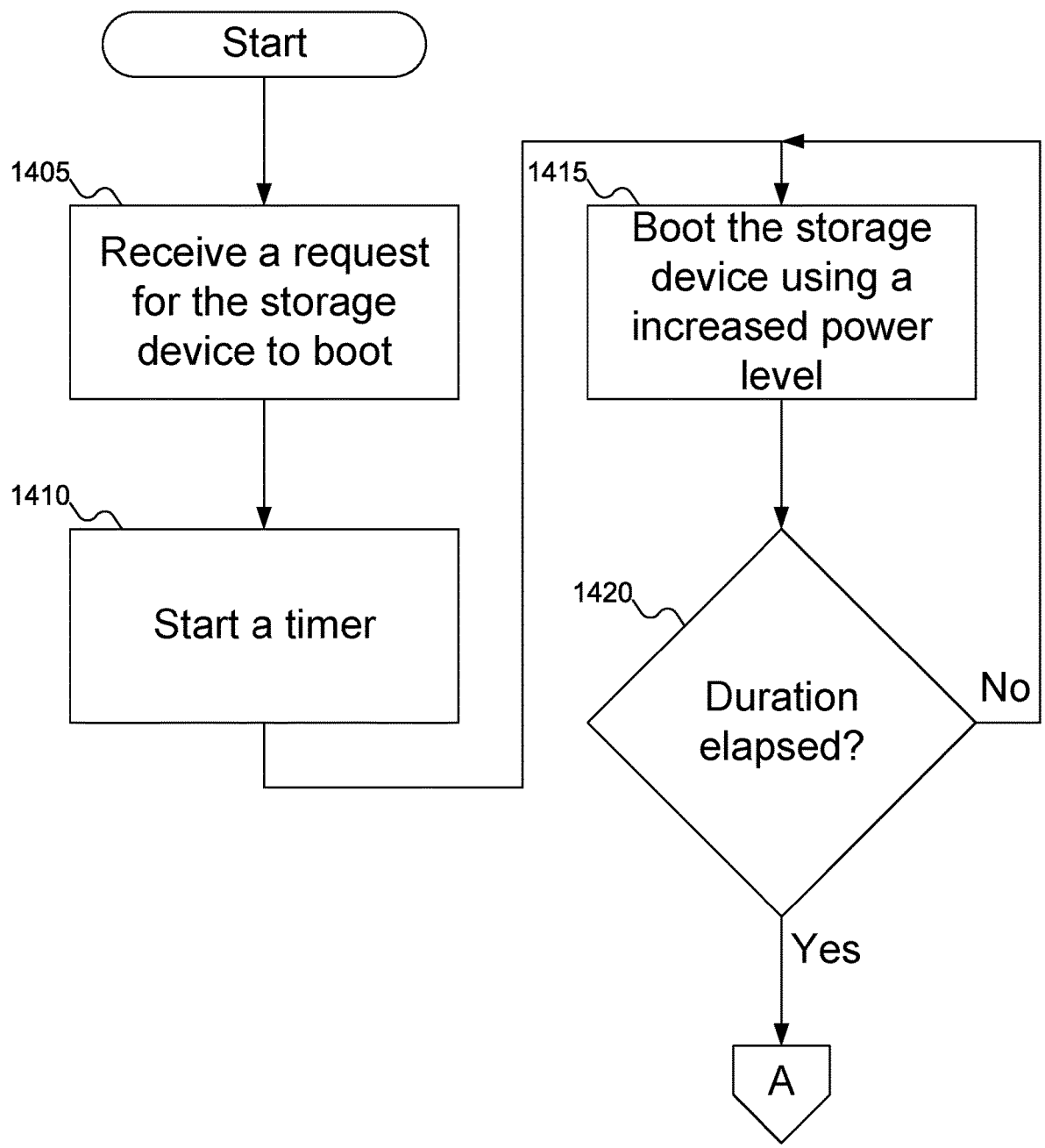
FIG. 14A shows a flowchart of an example procedure for the storage device of FIG. 1 to boot, according to embodiments of the disclosure.
Figure 14B:
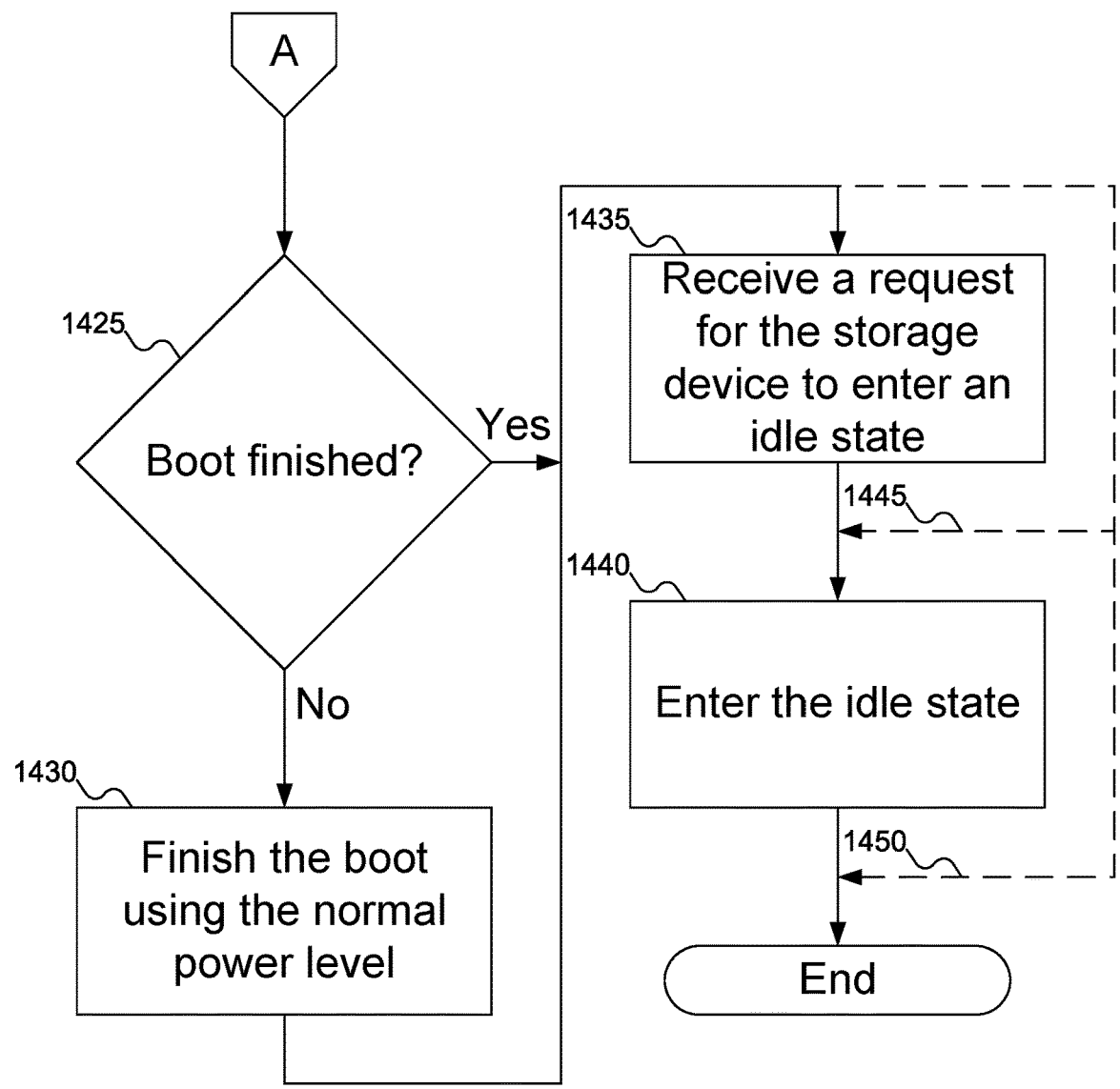
FIG. 14B continues the flowchart of the example procedure of FIG. 14A for the storage device of FIG. 1 to boot, according to embodiments of the disclosure.

FIGS. 14A-14B show a flowchart of an example procedure for storage device 120 of FIG. 1 to boot, according to embodiments of the disclosure. In FIG. 14A, at block 1405, receiver 435 of FIG. 4 may receive boot request 620 of FIG. 6 from machine 105 of FIG. 1. At block 1410, timer 460 of FIG. 4 may start. At block 1415, boot process 445 may start to boot storage device 120 of FIG. 1 using an increased power level. Note that this increased power level may be boot power level 320 of FIG. 3 (as specified by machine 105 of FIG. 1), a power level 510 of FIG. 5 for which storage device 120 of FIG. 1 has a validated boot process that may be less than boot power level 320 of FIG. 3, or some other power level (for example, a power level interpolated using some or all of boot power data 520 of FIG. 5 and/or boot power level 320 of FIG. 3).

At block 1420, storage device 120 of FIG. 1 may determine if duration 335 of FIG. 3 has elapsed, as measured by timer 460 of FIG. 4. If not, storage device 120 of FIG. 1 may continue to wait until duration 335 of FIG. 3 has elapsed, as measured by timer 460 of FIG. 4. Once duration 335 of FIG. 3 has elapsed, as measured by timer 460 of FIG. 4, at block 1425 (in FIG. 14B), boot process 445 of FIG. 4 may determine if storage device 120 of FIG. 1 has completed its boot process. If not, then at block 1430 boot process 445 of FIG>4 may complete the boot process using normal power level 330 of FIG. 3.

Once boot process 445 has finished the boot process (whether at boot power level 320 of FIG. 3 or normal power level 330 of FIG. 3), at block 1435 storage device 120 of FIG. 1 may receive idle request 625 of FIG. 6 from machine 105 of FIG. 1, and at block 1440 storage device 120 of FIG. 1 may enter an idle state. Note that machine 105 of FIG. 1 might not send idle request 625 of FIG. 6, and thus block 1435 may be omitted as shown by dashed line 1445, and storage device 120 of FIG. 1 might not enter an idle state without receive idle request 625 of FIG. 6, as shown by dashed line 1450.

In FIGS. 7-14B, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a storage unit that may be configured to use a higher than normal power level for a boot process. The host may specify the amount of power the storage unit may use, as well as a duration for which this amount of power may be used, before the storage unit is expected to use the normal power level. By using a higher than normal power level, the storage unit may boot more quickly, offering a technical advantage over storage units that only boot using the specified normal power level.

Embodiments of the disclosure may also include the storage unit informing the host of one or more power levels for which the storage unit has a validated boot process, and how long the boot process may take at that power level. By providing this information to the host, the host may be able to determine a power level the storage unit may use to boot more quickly, providing a technical advantage over storage units that only boot using the specified normal power level.

In some examples, hard disk drives (HDDs) may consume more power than their average allowable range during the transition from idle to active. This may be needed by HDDs because HDDs need to move their actuator from the parked position during idle onto the disks.

This increased power consumption by HDDs may be acceptable to hosts because the power exceeding the normal allowable is short and may be quantified and absorbed by enclosure level capacitors. In the event that the entire enclosure is coming back from idle, the host may spread the traffic to the HDDs distribute the power spikes in the enclosure.

Solid State Drives (SSDs) do not have an actuator to move every time they transition out of an idle state. But SSDs still use have a boot time. In a power constrained environment (for example 12 W) deployments, an SSD may throttle itself to stay within 12 W. Throttling methods may include: lowering the clock on controller/DRAM/channels and distributing fewer reads/writes to the NAND for reduced activity and parallelism. These options may slow the boot time of the SSD.

Generally boots are from cool server components and/or a cool server environment. Additional heat (beyond nominal ratings) may be acceptable due to lower temperatures. The host may control the boot order of all enclosure components. Slow boots may be undesirable for customers that need to use their servers. Over designed power supplies may tolerate power deviations from SSDs in an ordered boot scenario.

Embodiments of the disclosure may enable an SSD to consume more power during boot. The amount of extra power and length of time for this extra power may be quantified. This extra power may be used to accelerate the boot of the SSD by increasing clock rates (for example, for the controller, DRAM, channels, etc.) or increasing the number of inputs/outputs (IOs) outstanding to the underlying flash storage.

Embodiments of the disclosure may also allow the host to query the SSD for the requested peak power consumption and time duration. The host may accept this information or may communicate a lower bound to SSD on the excursion time and/or peak power. SSDs that are unable to complete the boot during these new limits set by the host may continue to boot in a normal power constrained manner. The hosts may use this information to distribute the boot of all SSDs in an enclosure or bound the power excursions to fit within the enclosure's capabilities.

While the above discussion focuses on a 12 W power limit, embodiments of the disclosure are applicable even in power limits that are not 12 W. For example, some large capacity high performance drives may be constrained at 25 W or higher.

The SSD may propose several operating limit choices. This may reduce validation efforts. Example options may include: 14 W for 1 second; 13 W for 4 seconds; 12.5 W for 10 seconds.

While the focus of the above discussion is on SSDs, embodiments of the disclosure may extend to other medias (phase change memory (PCM), magnetoresistive random-access memory (MRAM), resistive random-access memory (ReRAM), etc.) and other interfaces (non-volatile dual inline memory module (NVDIMM), cache-coherent interconnect protocols such as Compute Express Link (CXL), etc.).

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage unit, comprising:
an interface to a host;
a storage for a data;
a receiver to receive from the host a boot power data, the boot power data including a first power level and a duration; and
a circuit to boot the storage unit based at least in part on the boot power data,
wherein the storage unit includes a second power level, and the first power level is greater than the second power level.

Statement 2. An embodiment of the disclosure includes the storage unit according to statement 1, further comprising a controller to read or write the data from the storage based at least in part on a request from the host.

Statement 3. An embodiment of the disclosure includes the storage unit according to statement 1, wherein the second power level includes a normal maximum power level of the storage unit.

Statement 4. An embodiment of the disclosure includes the storage unit according to statement 1, wherein the storage unit includes at least one of a Solid State Drive (SSD), a hard disk drive, a phase-change memory (PCM), a magnetoresistive random-access memory (MRAM), or a resistive random-access memory (ReRAM).

Statement 5. An embodiment of the disclosure includes the storage unit according to statement 1, wherein the interface includes at least one of a Peripheral Component Interconnect Express (PCIe) interface, a non-volatile dual inline memory module (NVDMM) interface, a Compute Express Link (CXL) interface, a U.2 interface, a U.3 interface, or a M.2 interface.

Statement 6. An embodiment of the disclosure includes the storage unit according to statement 1, wherein the storage unit supports a protocol for communicating with the host.

Statement 7. An embodiment of the disclosure includes the storage unit according to statement 6, wherein the protocol includes at least one of a Non-Volatile Memory Express (NVMe) protocol, a Serial Attached Small Computer System Interface (SCSI) (SAS) protocol, or a Serial AT Attachment (SATA) protocol.

Statement 8. An embodiment of the disclosure includes the storage unit according to statement 1, wherein the boot power data includes a shape representing an upper bound of power consumed by the storage unit.

Statement 9. An embodiment of the disclosure includes the storage unit according to statement 8, wherein the shape includes at least one of a rectangle, a triangle, a curve, or a double rectangle.

Statement 10. An embodiment of the disclosure includes the storage unit according to statement 1, wherein the receiver includes a register to store the boot power data.

Statement 11. An embodiment of the disclosure includes the storage unit according to statement 1, wherein the receiver uses sideband signaling to receive the boot power data from the host.

Statement 12. An embodiment of the disclosure includes the storage unit according to statement 11, wherein the storage unit uses at least one of a system management bus (SMBus), a PCIe bus, or PCIe vendor device messages (VDM) for the sideband signaling.

Statement 13. An embodiment of the disclosure includes the storage unit according to statement 1, further comprising a transmitter to transmit to the host a second boot power data, the second boot power data including a third power level and a second duration.

Statement 14. An embodiment of the disclosure includes the storage unit according to statement 13, wherein the receiver is configured to receive, from the host, a request for the second boot power data.

Statement 15. An embodiment of the disclosure includes the storage unit according to statement 13, wherein the transmitter is configured to transmit to the host the second boot power data and a third boot power data, the third boot power data including a fourth power level and a third duration.

Statement 16. An embodiment of the disclosure includes the storage unit according to statement 15, wherein the transmitter includes a register to store at least one of the second boot power data or the third boot power data.

Statement 17. An embodiment of the disclosure includes the storage unit according to statement 15, wherein:
the second boot power data includes a first identifier;
the third boot power data includes a second identifier; and
the boot power data includes the first identifier.

Statement 18. An embodiment of the disclosure includes the storage unit according to statement 13, wherein the transmitter uses sideband signaling to transmit the second boot power data to the host.

Statement 19. An embodiment of the disclosure includes the storage unit according to statement 18, wherein the storage unit uses at least one of an SMBus, a PCIe bus, or PCIe VDM for the sideband signaling.

Statement 20. An embodiment of the disclosure includes the storage unit according to statement 1, wherein the circuit is configured to boot the storage unit twice using the boot power data.

Statement 21. An embodiment of the disclosure includes the storage unit according to statement 1, wherein the circuit is configured to boot the storage unit based at least in part on one of the first power level, the duration, or the second power level.

Statement 22. An embodiment of the disclosure includes the storage unit according to statement 21, wherein the circuit includes a timer for the circuit to boot the storage unit based at least in part on the first power level or the duration.

Statement 23. An embodiment of the disclosure includes the storage unit according to statement 22, wherein the circuit is further configured to boot the storage unit using the second power level or the timer indicating that the duration is elapsed.

Statement 24. An embodiment of the disclosure includes the storage unit according to statement 21, wherein the circuit is configured to boot the storage unit based at least in part on a third power level, the third power level less than the first power level and greater than the second power level.

Statement 25. An embodiment of the disclosure includes the storage unit according to statement 24, wherein the circuit includes a timer for the circuit to boot the storage unit based at least in part on the first power level or the duration.

Statement 26. An embodiment of the disclosure includes the storage unit according to statement 25, wherein the circuit is further configured to boot the storage unit using the second power level or the timer indicating that the duration is elapsed.

Statement 27. An embodiment of the disclosure includes the storage unit according to statement 1, wherein the receiver is configured to receive a request from the host to boot the storage unit.

Statement 28. An embodiment of the disclosure includes the storage unit according to statement 1, wherein the storage unit includes an idle state, the idle state using a third power level, the third power level less than the second power level.

Statement 29. An embodiment of the disclosure includes the storage unit according to statement 28, wherein the circuit is configured to place the storage unit in the idle state based at least in part a boot of the storage unit.

Statement 30. An embodiment of the disclosure includes the storage unit according to statement 28, wherein the receiver to receive a request from the host to enter the idle state based at least in part on a boot of the storage unit.

Statement 31. An embodiment of the disclosure includes a host, comprising:
a processor;
a storage unit, the storage unit including a second power level;
an interface between the processor and the storage unit; and
a transmitter to transmit a boot power data to the storage unit for use in booting the storage unit, the boot power data including a first power level and a duration,
wherein the first power level is greater than the second power level.

Statement 32. An embodiment of the disclosure includes the host according to statement 31, wherein the second power level includes a normal maximum power level of the storage unit.

Statement 33. An embodiment of the disclosure includes the host according to statement 31, wherein the storage unit includes at least one of a Solid State Drive (SSD), a hard disk drive, a phase-change memory (PCM), a magnetoresistive random-access memory (MRAM), or a resistive random-access memory (ReRAM).

Statement 34. An embodiment of the disclosure includes the host according to statement 31, wherein the interface includes at least one of a Peripheral Component Interconnect Express (PCIe) interface, a non-volatile dual inline memory module (NVDMM) interface, a Compute Express Link (CXL) interface, a U.2 interface, a U.3 interface, or a M.2 interface.

Statement 35. An embodiment of the disclosure includes the host according to statement 31, wherein the storage unit supports a protocol for communicating with the host.

Statement 36. An embodiment of the disclosure includes the host according to statement 35, wherein the protocol includes at least one of a Non-Volatile Memory Express (NVMe) protocol, a Serial Attached Small Computer System Interface (SCSI) (SAS) protocol, or a Serial AT Attachment (SATA) protocol.

Statement 37. An embodiment of the disclosure includes the host according to statement 31, wherein the boot power data includes a shape representing an upper bound of power consumed by the storage unit.

Statement 38. An embodiment of the disclosure includes the host according to statement 37, wherein the shape includes at least one of a rectangle, a triangle, a curve, or a double rectangle.

Statement 39. An embodiment of the disclosure includes the host according to statement 31, wherein the storage unit includes a register to store the boot power data.

Statement 40. An embodiment of the disclosure includes the host according to statement 39, wherein transmitter includes a to write the boot power data into the register of the storage unit.

Statement 41. An embodiment of the disclosure includes the host according to statement 31, wherein the transmitter uses sideband signaling to transmit the boot power data to the storage unit.

Statement 42. An embodiment of the disclosure includes the host according to statement 41, wherein the host uses at least one of a system management bus (SMBus), a PCIe bus, or PCIe vendor device messages (VDM) for the sideband signaling.

Statement 43. An embodiment of the disclosure includes the host according to statement 31, further comprising a receiver to receive from the storage unit a second boot power data, including a third power level and a second duration.

Statement 44. An embodiment of the disclosure includes the host according to statement 43, wherein the transmitter is configured to transmit, to the storage unit, a request for the second boot power data.

Statement 45. An embodiment of the disclosure includes the host according to statement 43, wherein the receiver is configured to receive from the storage unit the second boot power data and a third boot power data, the third boot power data including a fourth power level and a third duration.

Statement 46. An embodiment of the disclosure includes the host according to statement 45, wherein:
the storage unit includes a register to store at least the second boot power data or the third boot power data; and
the receiver includes a circuit to read the second boot power data and the third boot power data from the register of the storage unit.

Statement 47. An embodiment of the disclosure includes the host according to statement 45, wherein:
the second boot power data includes a first identifier;
the third boot power data includes a second identifier; and
the boot power data includes the first identifier.

Statement 48. An embodiment of the disclosure includes the host according to statement 43, wherein the receiver uses sideband signaling to receive the second boot power data from the storage unit.

Statement 49. An embodiment of the disclosure includes the host according to statement 48, wherein the host uses at least one of an SMBus, a PCIe bus, or PCIe VDM for the sideband signaling.

Statement 50. An embodiment of the disclosure includes the host according to statement 31, wherein the storage unit is configured to boot twice using the boot power data.

Statement 51. An embodiment of the disclosure includes the host according to statement 31, wherein the transmitter is configured to transmit a request to boot the storage unit.

Statement 52. An embodiment of the disclosure includes the host according to statement 31, further comprising a power supply, the power supply including a power output.

Statement 53. An embodiment of the disclosure includes the host according to statement 52, wherein:
the processor includes a third power level; and
the power output is greater than a sum of the second power level and the third power level.

Statement 54. An embodiment of the disclosure includes the host according to statement 53, wherein the power output is greater than a second sum of the first power level and the third power level.

Statement 55. An embodiment of the disclosure includes the host according to statement 53, wherein:
the host further comprises a second storage unit, the second storage unit including a fourth power level; and
the power output is greater than a second sum of the first power level, the third power level, and the fourth power level.

Statement 56. An embodiment of the disclosure includes the host according to statement 31, wherein:
the host further comprises a timer based at least in part on the duration; and
the transmitter is configured to transmit a first request to boot the first storage unit, and to transmit a second request to boot a second storage unit based at least in part on the timer.

Statement 57. An embodiment of the disclosure includes the host according to statement 56, further comprising a circuit to select a boot order for the storage unit and the second storage unit.

Statement 58. An embodiment of the disclosure includes the host according to statement 31, wherein the storage unit includes an idle state, the idle state using a third power level, the third power level less than the second power level.

Statement 59. An embodiment of the disclosure includes the host according to statement 58, further comprising a transmitter to transmit a request to the storage unit to enter the idle state based at least in part on a boot of the storage unit.

Statement 60. An embodiment of the disclosure includes a method, comprising: receiving, from a host, at a storage unit, a boot power data, the boot power data including a first power level and a duration; and
booting the storage unit using the boot power data,
wherein the storage unit includes a second power level, the first power level greater than the second power level.

Statement 61. An embodiment of the disclosure includes the method according to statement 60, wherein the second power level includes a normal maximum power level of the storage unit.

Statement 62. An embodiment of the disclosure includes the method according to statement 60, wherein the storage unit includes at least one of a Solid State Drive (SSD), a hard disk drive, a phase-change memory (PCM), a magnetoresistive random-access memory (MRAM), or a resistive random-access memory (ReRAM).

Statement 63. An embodiment of the disclosure includes the method according to statement 60, wherein the storage unit includes an interface, the interface including at least one of a Peripheral Component Interconnect Express (PCIe) interface, a non-volatile dual inline memory module (NVDMM) interface, a Compute Express Link (CXL) interface, a U.2 interface, a U.3 interface, or a M.2 interface.

Statement 64. An embodiment of the disclosure includes the method according to statement 60, wherein the storage unit supports a protocol for communicating with the host, the protocol including at least one of a Non-Volatile Memory Express (NVMe) protocol, a Serial Attached Small Computer System Interface (SCSI) (SAS) protocol, or a Serial AT Attachment (SATA) protocol.

Statement 65. An embodiment of the disclosure includes the method according to statement 60, wherein the boot power data includes a shape representing an upper bound of power consumed by the storage unit.

Statement 66. An embodiment of the disclosure includes the method according to statement 65, wherein the shape includes at least one of a rectangle, a triangle, a curve, or a double rectangle.

Statement 67. An embodiment of the disclosure includes the method according to statement 60, wherein receiving, from the host, at the storage unit, the boot power data includes reading the boot power data from a register of the storage unit.

Statement 68. An embodiment of the disclosure includes the method according to statement 60, wherein receiving, from the host, at the storage unit, the boot power data includes wherein receiving, from the host, at the storage unit, the boot power data using sideband signaling.

Statement 69. An embodiment of the disclosure includes the method according to statement 68, wherein the storage unit uses at least one of a system management bus (SMBus), a PCIe bus, or PCIe vendor device messages (VDM) for the sideband signaling.

Statement 70. An embodiment of the disclosure includes the method according to statement 60, further comprising transmitting, to the host, from the storage unit, a second boot power data, the second boot power data including a third power level and a second duration.

Statement 71. An embodiment of the disclosure includes the method according to statement 70, wherein transmitting, to the host, from the storage unit, the second boot power data includes receiving, from the host, at the storage unit, a request for the second boot power data.

Statement 72. An embodiment of the disclosure includes the method according to statement 70, wherein transmitting, to the host, from the storage unit, the second boot power data includes transmitting, to the host, from the storage unit, the second boot power data and a third boot power data, the third boot power data including a fourth power level and a third duration.

Statement 73. An embodiment of the disclosure includes the method according to statement 72, wherein:
the second boot power data includes a first identifier;
the third boot power data includes a second identifier; and
the boot power data includes the first identifier.

Statement 74. An embodiment of the disclosure includes the method according to statement 72, wherein transmitting, to the host, from the storage unit, the second boot power data includes writing at least one of the second boot power data or the third boot power data into a register of the storage unit.

Statement 75. An embodiment of the disclosure includes the method according to statement 70, wherein transmitting, to the host, from the storage unit, the second boot power data includes transmitting, to the host, from the storage unit, the second boot power data using sideband signaling.

Statement 76. An embodiment of the disclosure includes the method according to statement 75, wherein the storage unit uses at least one of a system management bus (SMBus), a PCIe bus, or PCIe vendor device messages (VDM) for the sideband signaling.

Statement 77. An embodiment of the disclosure includes the method according to statement 60, further comprising booting the storage unit twice using the boot power data.

Statement 78. An embodiment of the disclosure includes the method according to statement 60, wherein booting the storage unit using the boot power data includes booting the storage unit based at least in part on one of the first power level, the duration, and the second power level.

Statement 79. An embodiment of the disclosure includes the method according to statement 78, wherein booting the storage unit based at least in part on one of the first power level, the duration, and the second power level includes timing, using a timer, a boot of the storage unit based at least in part on the first power level or the duration.

Statement 80. An embodiment of the disclosure includes the method according to statement 78, wherein booting the storage unit based at least in part on one of the first power level, the duration, and the second power level includes booting the storage unit based at least in part on the second power level or the timer indicating that the duration is elapsed.

Statement 81. An embodiment of the disclosure includes the method according to statement 78, wherein booting the storage unit based at least in part on one of the first power level, the duration, and the second power level includes booting the storage unit based at least in part on a third power level, the third power level less than the first power level and greater than the second power level.

Statement 82. An embodiment of the disclosure includes the method according to statement 81, wherein booting the storage unit at a third power level includes timing, using a timer, a boot of the storage unit based at least in part on the third power level or the duration.

Statement 83. An embodiment of the disclosure includes the method according to statement 82, wherein booting the storage unit based at least in part on one of the first power level, the duration, and the second power level further includes booting the storage unit based at least in part on the second power level or the timer indicating that the duration is elapsed.

Statement 84. An embodiment of the disclosure includes the method according to statement 60, wherein booting the storage unit using the boot power data includes receiving, from the host, at the storage unit, a request to boot the storage unit.

Statement 85. An embodiment of the disclosure includes the method according to statement 60, further comprising placing the storage unit in an idle state.

Statement 86. An embodiment of the disclosure includes the method according to statement 85, wherein booting the storage unit using the boot power data includes placing the storage unit in the idle state.

Statement 87. An embodiment of the disclosure includes the method according to statement 85, wherein placing the storage unit in the idle state includes receiving, from the host, at the storage unit, a request for the storage unit to enter the idle state.

Statement 88. An embodiment of the disclosure includes a method, comprising: selecting a first power level and a duration for a storage unit, the storage unit including a second power level; and
transmitting, from the host to the storage unit, a boot power data including the first power level and the duration,
wherein the first power level is greater than the second power level.

Statement 89. An embodiment of the disclosure includes the method according to statement 88, wherein the second power level includes a normal maximum power level of the storage unit.

Statement 90. An embodiment of the disclosure includes the method according to statement 88, wherein the storage unit includes at least one of a Solid State Drive (SSD), a hard disk drive, a phase-change memory (PCM), a magnetoresistive random-access memory (MRAM), or a resistive random-access memory (ReRAM).

Statement 91. An embodiment of the disclosure includes the method according to statement 88, wherein an interface between the processor and the storage unit includes at least one of a Peripheral Component Interconnect Express (PCIe) interface, a non-volatile dual inline memory module (NVDMM) interface, a Compute Express Link (CXL) interface, a U.2 interface, a U.3 interface, or a M.2 interface.

Statement 92. An embodiment of the disclosure includes the method according to statement 88, wherein the storage unit supports a protocol for communicating with the host.

Statement 93. An embodiment of the disclosure includes the method according to statement 92, wherein the protocol includes at least one of a Non-Volatile Memory Express (NVMe) protocol, a Serial Attached Small Computer System Interface (SCSI) (SAS) protocol, or a Serial AT Attachment (SATA) protocol.

Statement 94. An embodiment of the disclosure includes the method according to statement 88, wherein the boot power data includes a shape representing an upper bound of power consumed by the storage unit.

Statement 95. An embodiment of the disclosure includes the method according to statement 94, wherein the shape includes at least one of a rectangle, a triangle, a curve, or a double rectangle.

Statement 96. An embodiment of the disclosure includes the method according to statement 88, wherein transmitting, from the host to the storage unit, the boot power data including the first power level and the duration includes writing the boot power data into a register of the storage unit.

Statement 97. An embodiment of the disclosure includes the method according to statement 88, wherein transmitting, from the host to the storage unit, the boot power data including the first power level and the duration includes transmitting, from the host to the storage unit, the boot power data including the first power level and the duration using sideband signaling.

Statement 98. An embodiment of the disclosure includes the method according to statement 97, wherein the host uses at least one of a system management bus (SMBus), a PCIe bus, or PCIe vendor device messages (VDM) for the sideband signaling.

Statement 99. An embodiment of the disclosure includes the method according to statement 88, further comprising receiving, from the storage unit, at the host, a second boot power data, the second boot power data including a third power level and a second duration.

Statement 100. An embodiment of the disclosure includes the method according to statement 99, wherein receiving, from the storage unit, at the host, the second boot power data includes transmitting, to the storage unit, from the host, a request for the second boot power data.

Statement 101. An embodiment of the disclosure includes the method according to statement 99, wherein receiving, from the storage unit, at the host, a second boot power data includes receiving, from the storage unit, at the host, a third boot power data, the third boot power data including a fourth power level and a third duration.

Statement 102. An embodiment of the disclosure includes the method according to statement 101, wherein receiving, from the storage unit, at the host, a third boot power data includes reading the third boot power data from a register of the storage unit.

Statement 103. An embodiment of the disclosure includes the method according to statement 101, wherein:
the second boot power data includes a first identifier;
the third boot power data includes a second identifier; and
the boot power data includes the first identifier.

Statement 104. An embodiment of the disclosure includes the method according to statement 99, wherein receiving, from the storage unit, at the host, the second boot power data includes receiving, from the storage unit, at the host, the second boot power data using sideband signaling.

Statement 105. An embodiment of the disclosure includes the method according to statement 104, wherein the host uses at least one of an SMBus, a PCIe bus, or PCIe VDM for the sideband signaling.

Statement 106. An embodiment of the disclosure includes the method according to statement 88, further comprising transmitting, to the storage unit, from the host, a request to boot using the boot power data.

Statement 107. An embodiment of the disclosure includes the method according to statement 106, further comprising transmitting, to a second storage unit, from the host, a second request to boot using a second boot power data.

Statement 108. An embodiment of the disclosure includes the method according to statement 107, further comprising timing, using a timer, a boot of the storage unit based at least in part on the boot power data.

Statement 109. An embodiment of the disclosure includes the method according to statement 108, wherein transmitting, to the second storage unit, from the host, the second request to boot using the second boot power data includes transmitting, to the second storage unit, from the host, the second request to boot using the second boot power data based at least in part on the timer indicating that the duration is elapsed.

Statement 110. An embodiment of the disclosure includes the method according to statement 107, further comprising selecting a boot order for the storage unit and the second storage.

Statement 111. An embodiment of the disclosure includes the method according to statement 88, further comprising:
determining a power output of a power supply;
determining a third power level of a processor; and
determining the first power level based at least in part on the second power level, the third power level, or the power output.

Statement 112. An embodiment of the disclosure includes the method according to statement 111, wherein the power output is greater than a sum of the first power level and the third power level.

Statement 113. An embodiment of the disclosure includes the method according to statement 112, wherein:
the method further comprises determining a fourth power level of a second storage unit; and
determining the first power level based at least in part on the second power level, the third power level, or the power output includes determining the first power level based at least in part on the second power level, the third power level, the fourth power level, or the power output.

Statement 114. An embodiment of the disclosure includes the method according to statement 113, wherein the power output is greater than a sum of the first power level, the third power level, and the fourth power level.

Statement 115. An embodiment of the disclosure includes the method according to statement 88, further comprising transmitting, to the storage unit, from the host, a request to enter an idle state, the idle state using a third power level, the third power level less than the second power level.

Statement 116. An embodiment of the disclosure includes an article, comprising a non-transitory storage medium, the non-transitory storage medium having stored thereon instructions that, when executed by a machine, result in:receiving, from a host, at a storage unit, a boot power data, the boot power data including a first power level and a duration; and
booting the storage unit using the boot power data,
wherein the storage unit includes a second power level, the first power level greater than the second power level.

Statement 117. An embodiment of the disclosure includes the article according to statement 116, wherein the second power level includes a normal maximum power level of the storage unit.

Statement 118. An embodiment of the disclosure includes the article according to statement 116, wherein the storage unit includes at least one of a Solid State Drive (SSD), a hard disk drive, a phase-change memory (PCM), a magnetoresistive random-access memory (MRAM), or a resistive random-access memory (ReRAM).

Statement 119. An embodiment of the disclosure includes the article according to statement 116, wherein the storage unit includes an interface, the interface including at least one of a Peripheral Component Interconnect Express (PCIe) interface, a non-volatile dual inline memory module (NVDMM) interface, a Compute Express Link (CXL) interface, a U.2 interface, a U.3 interface, or a M.2 interface.

Statement 120. An embodiment of the disclosure includes the article according to statement 116, wherein the storage unit supports a protocol for communicating with the host, the protocol including at least one of a Non-Volatile Memory Express (NVMe) protocol, a Serial Attached Small Computer System Interface (SCSI) (SAS) protocol, or a Serial AT Attachment (SATA) protocol.

Statement 121. An embodiment of the disclosure includes the article according to statement 116, wherein the boot power data includes a shape representing an upper bound of power consumed by the storage unit.

Statement 122. An embodiment of the disclosure includes the article according to statement 121, wherein the shape includes at least one of a rectangle, a triangle, a curve, or a double rectangle.

Statement 123. An embodiment of the disclosure includes the article according to statement 116, wherein receiving, from the host, at the storage unit, the boot power data includes reading the boot power data from a register of the storage unit.

Statement 124. An embodiment of the disclosure includes the article according to statement 116, wherein receiving, from the host, at the storage unit, the boot power data includes wherein receiving, from the host, at the storage unit, the boot power data using sideband signaling.

Statement 125. An embodiment of the disclosure includes the article according to statement 124, wherein the storage unit uses at least one of a system management bus (SMBus), a PCIe bus, or PCIe vendor device messages (VDM) for the sideband signaling.

Statement 126. An embodiment of the disclosure includes the article according to statement 116, the non-transitory storage medium having stored thereon further instructions that, when executed by the machine, result in transmitting, to the host, from the storage unit, a second boot power data, the second boot power data including a third power level and a second duration.

Statement 127. An embodiment of the disclosure includes the article according to statement 126, wherein transmitting, to the host, from the storage unit, the second boot power data includes receiving, from the host, at the storage unit, a request for the second boot power data.

Statement 128. An embodiment of the disclosure includes the article according to statement 126, wherein transmitting, to the host, from the storage unit, the second boot power data includes transmitting, to the host, from the storage unit, the second boot power data and a third boot power data, the third boot power data including a fourth power level and a third duration.

Statement 129. An embodiment of the disclosure includes the article according to statement 128, wherein:
the second boot power data includes a first identifier;
the third boot power data includes a second identifier; and
the boot power data includes the first identifier.

Statement 130. An embodiment of the disclosure includes the article according to statement 128, wherein transmitting, to the host, from the storage unit, the second boot power data includes writing at least one of the second boot power data or the third boot power data into a register of the storage unit.

Statement 131. An embodiment of the disclosure includes the article according to statement 126, wherein transmitting, to the host, from the storage unit, the second boot power data includes transmitting, to the host, from the storage unit, the second boot power data using sideband signaling.

Statement 132. An embodiment of the disclosure includes the article according to statement 131, wherein the storage unit uses at least one of a system management bus (SMBus), a PCIe bus, or PCIe vendor device messages (VDM) for the sideband signaling.

Statement 133. An embodiment of the disclosure includes the article according to statement 116, the non-transitory storage medium having stored thereon further instructions that, when executed by the machine, result in booting the storage unit twice using the boot power data.

Statement 134. An embodiment of the disclosure includes the article according to statement 116, wherein booting the storage unit using the boot power data includes booting the storage unit based at least in part on one of the first power level, the duration, and the second power level.

Statement 135. An embodiment of the disclosure includes the article according to statement 134, wherein booting the storage unit based at least in part on one of the first power level, the duration, and the second power level includes timing, using a timer, a boot of the storage unit based at least in part on the first power level or the duration.

Statement 136. An embodiment of the disclosure includes the article according to statement 134, wherein booting the storage unit based at least in part on one of the first power level, the duration, and the second power level includes booting the storage unit based at least in part on the second power level or the timer indicating that the duration is elapsed.

Statement 137. An embodiment of the disclosure includes the article according to statement 134, wherein booting the storage unit based at least in part on one of the first power level, the duration, and the second power level includes booting the storage unit based at least in part on a third power level, the third power level less than the first power level and greater than the second power level.

Statement 138. An embodiment of the disclosure includes the article according to statement 137, wherein booting the storage unit at a third power level includes timing, using a timer, a boot of the storage unit based at least in part on the third power level or the duration.

Statement 139. An embodiment of the disclosure includes the article according to statement 138, wherein booting the storage unit based at least in part on one of the first power level, the duration, and the second power level further includes booting the storage unit based at least in part on the second power level or the timer indicating that the duration is elapsed.

Statement 140. An embodiment of the disclosure includes the article according to statement 116, wherein booting the storage unit using the boot power data includes receiving, from the host, at the storage unit, a request to boot the storage unit.

Statement 141. An embodiment of the disclosure includes the article according to statement 116, the non-transitory storage medium having stored thereon further instructions that, when executed by the machine, result in placing the storage unit in an idle state.

Statement 142. An embodiment of the disclosure includes the article according to statement 141, wherein booting the storage unit using the boot power data includes placing the storage unit in the idle state.

Statement 143. An embodiment of the disclosure includes the article according to statement 141, wherein placing the storage unit in the idle state includes receiving, from the host, at the storage unit, a request for the storage unit to enter the idle state.

Statement 144. An embodiment of the disclosure includes an article, comprising a non-transitory storage medium, the non-transitory storage medium having stored thereon instructions that, when executed by a machine, result in:
selecting a first power level and a duration for a storage unit, the storage unit including a second power level; and
transmitting, from the host to the storage unit, a boot power data including the first power level and the duration, wherein the first power level is greater than the second power level.

Statement 145. An embodiment of the disclosure includes the article according to statement 144, wherein the second power level includes a normal maximum power level of the storage unit.

Statement 146. An embodiment of the disclosure includes the article according to statement 144, wherein the storage unit includes at least one of a Solid State Drive (SSD), a hard disk drive, a phase-change memory (PCM), a magnetoresistive random-access memory (MRAM), or a resistive random-access memory (ReRAM).

Statement 147. An embodiment of the disclosure includes the article according to statement 144, wherein an interface between the processor and the storage unit includes at least one of a Peripheral Component Interconnect Express (PCIe) interface, a non-volatile dual inline memory module (NVDMM) interface, a Compute Express Link (CXL) interface, a U.2 interface, a U.3 interface, or a M.2 interface.

Statement 148. An embodiment of the disclosure includes the article according to statement 144, wherein the storage unit supports a protocol for communicating with the host.

Statement 149. An embodiment of the disclosure includes the article according to statement 148, wherein the protocol includes at least one of a Non-Volatile Memory Express (NVMe) protocol, a Serial Attached Small Computer System Interface (SCSI) (SAS) protocol, or a Serial AT Attachment (SATA) protocol.

Statement 150. An embodiment of the disclosure includes the article according to statement 144, wherein the boot power data includes a shape representing an upper bound of power consumed by the storage unit.

Statement 151. An embodiment of the disclosure includes the article according to statement 150, wherein the shape includes at least one of a rectangle, a triangle, a curve, or a double rectangle.

Statement 152. An embodiment of the disclosure includes the article according to statement 144, wherein transmitting, from the host to the storage unit, the boot power data including the first power level and the duration includes writing the boot power data into a register of the storage unit.

Statement 153. An embodiment of the disclosure includes the article according to statement 144, wherein transmitting, from the host to the storage unit, the boot power data including the first power level and the duration includes transmitting, from the host to the storage unit, the boot power data including the first power level and the duration using sideband signaling.

Statement 154. An embodiment of the disclosure includes the article according to statement 153, wherein the host uses at least one of a system management bus (SMBus), a PCIe bus, or PCIe vendor device messages (VDM) for the sideband signaling.

Statement 155. An embodiment of the disclosure includes the article according to statement 144, the non-transitory storage medium having stored thereon further instructions that, when executed by the machine, result in receiving, from the storage unit, at the host, a second boot power data, the second boot power data including a third power level and a second duration.

Statement 156. An embodiment of the disclosure includes the article according to statement 155, wherein receiving, from the storage unit, at the host, the second boot power data includes transmitting, to the storage unit, from the host, a request for the second boot power data.

Statement 157. An embodiment of the disclosure includes the article according to statement 155, wherein receiving, from the storage unit, at the host, a second boot power data includes receiving, from the storage unit, at the host, a third boot power data, the third boot power data including a fourth power level and a third duration.

Statement 158. An embodiment of the disclosure includes the article according to statement 157, wherein receiving, from the storage unit, at the host, a third boot power data includes reading the third boot power data from a register of the storage unit.

Statement 159. An embodiment of the disclosure includes the article according to statement 157, wherein:
the second boot power data includes a first identifier;
the third boot power data includes a second identifier; and
the boot power data includes the first identifier.

Statement 160. An embodiment of the disclosure includes the article according to statement 155, wherein receiving, from the storage unit, at the host, the second boot power data includes receiving, from the storage unit, at the host, the second boot power data using sideband signaling.

Statement 161. An embodiment of the disclosure includes the article according to statement 160, wherein the host uses at least one of an SMBus, a PCIe bus, or PCIe VDM for the sideband signaling.

Statement 162. An embodiment of the disclosure includes the article according to statement 144, the non-transitory storage medium having stored thereon further instructions that, when executed by the machine, result in transmitting, to the storage unit, from the host, a request to boot using the boot power data.

Statement 163. An embodiment of the disclosure includes the article according to statement 162, the non-transitory storage medium having stored thereon further instructions that, when executed by the machine, result in transmitting, to a second storage unit, from the host, a second request to boot using a second boot power data.

Statement 164. An embodiment of the disclosure includes the article according to statement 163, the non-transitory storage medium having stored thereon further instructions that, when executed by the machine, result in timing, using a timer, a boot of the storage unit based at least in part on the boot power data.

Statement 165. An embodiment of the disclosure includes the article according to statement 164, the non-transitory storage medium having stored thereon further instructions that, when executed by the machine, result in transmitting, to a second storage unit, from the host, a second request to boot using a second boot power data based at least in part on the timer indicating that the duration is elapsed.

Statement 166. An embodiment of the disclosure includes the article according to statement 163, the non-transitory storage medium having stored thereon further instructions that, when executed by the machine, result in selecting a boot order for the storage unit and the second storage.

Statement 167. An embodiment of the disclosure includes the article according to statement 144, the non-transitory storage medium having stored thereon further instructions that, when executed by the machine, result in:
determining a power output of a power supply;
determining a third power level of a processor; and
determining the first power level based at least in part on the second power level, the third power level, or the power output.

Statement 168. An embodiment of the disclosure includes the article according to statement 167, wherein the power output is greater than a sum of the first power level and the third power level.

Statement 169. An embodiment of the disclosure includes the article according to statement 168, wherein:

the non-transitory storage medium has stored thereon further instructions that, when executed by the machine, result in determining a fourth power level of a second storage unit; and determining the first power level based at least in part on the second power level, the third power level, or the power output includes determining the first power level based at least in part on the second power level, the third power level, the fourth power level, or the power output.

Statement 170. An embodiment of the disclosure includes the article according to statement 169, wherein the power output is greater than a sum of the first power level, the third power level, and the fourth power level.

Statement 171. An embodiment of the disclosure includes the article according to statement 144, the non-transitory storage medium having stored thereon further instructions that, when executed by the machine, result in transmitting, to the storage unit, from the host, a request to enter an idle state, the idle state using a third power level, the third power level less than the second power level.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage unit, comprising:
an interface to a host;
a storage for a data;
a receiver to receive from the host a boot power data, the boot power data including a first power level and a duration; and
a circuit to:
initiate a first portion of a boot process of the storage unit using the first power level based on the duration; and
initiate a second portion of the boot process of the storage unit using a second power level based on the duration, wherein:
the boot power data further includes a third power level and a second duration, and
the first power level and the third power level are greater than the second power level.

2. The storage unit according to claim 1, wherein the storage unit includes at least one of a Solid State Drive (SSD), a hard disk drive, a phase-change memory (PCM), a magnetoresistive random-access memory (MRAM), or a resistive random-access memory (ReRAM).

3. The storage unit according to claim 1, wherein the boot power data includes an upper bound of power consumed by the storage unit.

4. The storage unit according to claim 1, further comprising a transmitter to transmit to the host a second boot power data, the second boot power data including a third power level and a second duration.

5. The storage unit according to claim 1, wherein the circuit includes a timer for the circuit to boot the storage unit using the first power level based at least in part on the duration.

6. The storage unit according to claim 5, wherein the circuit is further configured to boot the storage unit using the second power level based at least in part on the timer indicating that the duration is elapsed.

7. The storage unit according to claim 1, wherein the second portion of the boot process is initiated based on an expiration of the duration.

8. A method, comprising:
receiving, from a host, at a storage unit, a boot power data, the boot power data including a first power level and a duration;
initiating a first portion of a boot process of the storage unit using the first power level based on the duration; and
initiating a second portion of the boot process of the storage unit using a second power level based on the duration, wherein:
the boot power data further includes a third power level and a second duration, and
the first power level and the third power level are greater than the second power level.

9. The method according to claim 8, wherein the storage unit includes at least one of a Solid State Drive (SSD), a hard disk drive, a phase-change memory (PCM), a magnetoresistive random-access memory (MRAM), or a resistive random-access memory (ReRAM).

10. The method according to claim 8, wherein the boot power data includes an upper bound of power consumed by the storage unit.

11. The method according to claim 8, further comprising transmitting, to the host, from the storage unit, a second boot power data, the second boot power data including a third power level and a second duration.

12. The method according to claim 8, wherein booting the storage unit based at least in part on one of the first power level, the duration, and the second power level includes timing, using a timer, a boot of the storage unit based at least in part on the first power level or the duration.

13. The method according to claim 12, wherein booting the storage unit based at least in part on one of the first power level, the duration, and the second power level includes booting the storage unit using the second power level based at least in part on the timer indicating that the duration is elapsed.

14. A method according to claim 8, wherein:
the boot power data further includes a third power level and a second duration; and
booting the storage unit using the first power level based at least in part on the duration includes:
booting the storage unit using the first power level based at least in part on the duration and using the third power level based at least in part on the second duration,
wherein the first power level and the third power level are greater than the second power level.

15. A method, comprising:
selecting a first power level and a duration for a first portion of a boot process of a storage unit, the storage unit including a second power level for a second portion of the boot process of the storage unit; and
transmitting, from a host to the storage unit, a boot power data including the first power level and the duration, wherein:
the boot power data further includes a third power level and a second duration, and
the first power level and the third power level are greater than the second power level.

16. The method according to claim 15, wherein the boot power data includes an upper bound of power consumed by the storage unit.

17. The method according to claim 15, further comprising receiving, from the storage unit, at the host, a second boot power data, the second boot power data including a third power level and a second duration.

18. The method according to claim 15, further comprising transmitting, to the storage unit, from the host, a request to boot using the boot power data.

19. The method according to claim 18, further comprising transmitting, to a second storage unit, from the host, a second request to boot using a second boot power data.

20. The method according to claim 19, further comprising timing, using a timer, a boot of the storage unit based at least in part on the boot power data.

* * * * *